US010341834B2

(12) United States Patent
Lee

(10) Patent No.: US 10,341,834 B2
(45) Date of Patent: Jul. 2, 2019

(54) MOBILE TERMINAL AND METHOD FOR CONTROLLING THE SAME

(71) Applicant: LG ELECTRONICS INC., Seoul (KR)

(72) Inventor: Minkyu Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/572,583

(22) PCT Filed: May 19, 2015

(86) PCT No.: PCT/KR2015/005004
§ 371 (c)(1),
(2) Date: Nov. 8, 2017

(87) PCT Pub. No.: WO2016/182108
PCT Pub. Date: Nov. 17, 2016

(65) Prior Publication Data
US 2018/0132088 A1 May 10, 2018

(30) Foreign Application Priority Data
May 12, 2015 (KR) .................... 10-2015-0065896

(51) Int. Cl.
*H04B 7/00* (2006.01)
*H04W 4/80* (2018.01)
(Continued)

(52) U.S. Cl.
CPC ............ *H04W 4/80* (2018.02); *G06F 3/0488* (2013.01); *H04M 1/7253* (2013.01);
(Continued)

(58) Field of Classification Search
CPC ... H04W 4/80; H04W 8/005; H04M 1/72583; H04M 2250/22; H04M 1/7253
(Continued)

(56) References Cited

U.S. PATENT DOCUMENTS 7,957,762 B2 * 6/2011 Herz ..................... G06F 1/3203
455/550.1
9,167,146 B2 * 10/2015 Eom ..................... H04W 12/04
(Continued)

FOREIGN PATENT DOCUMENTS

| KR | 10-2004-0074338 | 8/2004 |
| KR | 10-2009-0076104 | 7/2009 |

(Continued)

OTHER PUBLICATIONS

International Search Report (with English Translation) and Written Opinion dated Feb. 12, 2016 issued in Application No. PCT/KR2015/005004.

Primary Examiner — April G Gonzales
(74) Attorney, Agent, or Firm — KED & Associates, LLP

(57) ABSTRACT

The present invention relates to a mobile terminal and a method for controlling the same. The mobile terminal comprises: a short-range communication module; a touch screen including an indicator area for indicating a state of the terminal; and a control unit. The control unit displays, on the indicator area, a short-range communication icon indicating whether the short-range communication module is activated or not; displays information on a device which has been set to be connected to the short-range communication module, on the basis of a change in the displacement with respect a particular direction of a user input inputted in the indicator area; and if the dimension of the displacement of the user input is greater than a first reference distance, scans the surroundings and displays information on connectable devices. Thereby, when using a short-range wireless com- (Continued)

munication function in a mobile terminal, it is possible to control overall short-range wireless communication functions, such as search for short-range wireless communication devices, connection thereto, and application execution, by means of a simple input, without going through a separate menu selection step or screen transition step.

20 Claims, 43 Drawing Sheets

(51) Int. Cl.
*H04W 8/00* (2009.01)
*G06F 3/0488* (2013.01)
*H04M 1/725* (2006.01)

(52) U.S. Cl.
CPC ........ *H04W 8/005* (2013.01); *H04M 1/72583* (2013.01); *H04M 2250/22* (2013.01)

(58) Field of Classification Search
USPC ....................................................... 455/41.2
See application file for complete search history.

(56) References Cited

U.S. PATENT DOCUMENTS

| | | | | |
|---|---|---|---|---|
| 9,495,448 B2* | 11/2016 | Jeon | ....................... | G06F 16/637 |
| 9,900,833 B2* | 2/2018 | Yeon | ....................... | H04W 48/16 |
| 9,948,523 B2* | 4/2018 | Won | ....................... | G06F 3/04817 |
| 2009/0322695 A1* | 12/2009 | Cho | ....................... | G06F 3/0416 |
| | | | | 345/173 |
| 2010/0085316 A1* | 4/2010 | Kim | ....................... | G06F 1/1616 |
| | | | | 345/173 |
| 2013/0040562 A1* | 2/2013 | Song | ................... | H04M 1/7253 |
| | | | | 455/41.1 |
| 2014/0101588 A1* | 4/2014 | Chang | ................. | G06F 3/04817 |
| | | | | 715/769 |
| 2014/0115455 A1* | 4/2014 | Kim | ....................... | G06F 3/0482 |
| | | | | 715/702 |
| 2014/0163333 A1* | 6/2014 | Horseman | ............ | A61B 5/6887 |
| | | | | 600/301 |

FOREIGN PATENT DOCUMENTS

| | | |
|---|---|---|
| KR | 10-2012-0040765 | 4/2012 |
| KR | 10-2014-0076077 | 6/2014 |
| KR | 10-2014-0112900 | 9/2014 |

* cited by examiner (a) (b)

(c)

(a)

(b)

(a)

(b)

(a)              (b)

(a)       (b)       (c)

(a)

(b)

(c)

(a)          (b)

(a)

(b)

MOBILE TERMINAL AND METHOD FOR CONTROLLING THE SAME

CROSS-REFERENCE TO RELATED PATENT APPLICATIONS

This application is a U.S. National Stage Application under 35 U.S.C. § 371 of PCT Application No. PCT/KR2015/005004, filed May 19, 2015, which claims priority to Korean Patent Application No. 10-2015-0065896, filed May 12, 2015, whose entire disclosures are hereby incorporated by reference.

BACKGROUND OF THE INVENTION

Field of the Invention

The present invention relates to a mobile terminal and a method of controlling the same that can control a general short range wireless communication function such as search, connection, and application execution of a short range wireless communication device with a simple input without a separate menu selection process or a screen conversion process upon using a short range wireless communication function in the mobile terminal.

Related Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Nowadays, mobile terminals may implement various functions through a connection to a peripheral device such as a smart watch and glasses using a short range communication function such as Bluetooth. In this way, when using a short range communication function, technology is required that enables to easily use a general short range wireless communication function such as search, connection, and application execution of various short range wireless communication devices.

SUMMARY OF THE INVENTION

Accordingly, an object of the present invention is to address the above-noted and other problems. Another object of the present invention is to provide a mobile terminal and a method of controlling the same that can control a general short range wireless communication function such as search, connection, and application execution of a short range wireless communication device with a simple input without a separate menu selection process or a screen conversion process upon using a short range wireless communication function in the mobile terminal.

In an aspect, a mobile terminal includes a short range communication module; a touch screen including an indicator area that displays a state of the terminal; and a controller configured to display a short range communication icon that indicates whether the short range communication module is activated in the indicator area, to display information of a device to which a connection to the short range communication module is set based on a displacement change in a specific direction of a user input that is input in the indicator area; and to scan a periphery to display information of connectable devices, when a displacement magnitude of the user input is larger than a first reference distance.

In another aspect, a mobile terminal includes a short range communication module; a touch screen including an indicator area that displays a state of the terminal; and a controller configured to display a short range communication icon that indicates whether the short range communication module is activated in the indicator area, to display information of a device to which a connection to the short range communication module is set in the indicator area based on a displacement change of the user input when a user input to the short range communication icon is input in a length direction of the indicator and to scan a periphery to display information of connectable devices in the indicator area when a displacement magnitude of the user input is larger than a first reference distance.

In another aspect, a mobile terminal includes a short range communication module; a touch screen including an indicator area that displays a state of the terminal; and a controller configured to display a short range communication icon that indicates whether the short range communication module is activated in the indicator area, to display an icon for controlling a short range communication function in an area of the touch screen, except for the indicator area, when a user input to the short range communication icon is received, to display information of a device to which a connection to the short range communication module is set based on a displacement change of a user input to an icon for controlling the short range communication function; and to scan a periphery to display information of connectable devices, when a displacement magnitude of the user input is larger than a first reference distance.

In another aspect, a method of controlling a mobile terminal having a touch screen including an indicator area that displays a state of a short range communication module and a terminal includes: displaying a short range communication icon that indicates whether the short range communication module is activated in the indicator area; displaying information of a device to which a connection to the short range communication module is set based on a displacement change in a specific direction of a user input that is input in the indicator area; and scanning, when a displacement magnitude of the user input is larger than a first reference, a periphery to display information of connectable devices.

ADVANTAGEOUS EFFECTS

An effect of a mobile terminal and a method of controlling the same according to the present invention will be described.

According to at least one of exemplary embodiments of the present invention, a general short range wireless communication function such as search, connection, and application execution of a short range wireless communication device can be controlled with a simple input without a separate menu selection process or a screen conversion process upon using a short range wireless communication function in a mobile terminal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

DESCRIPTION OF EXEMPLARY EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1:
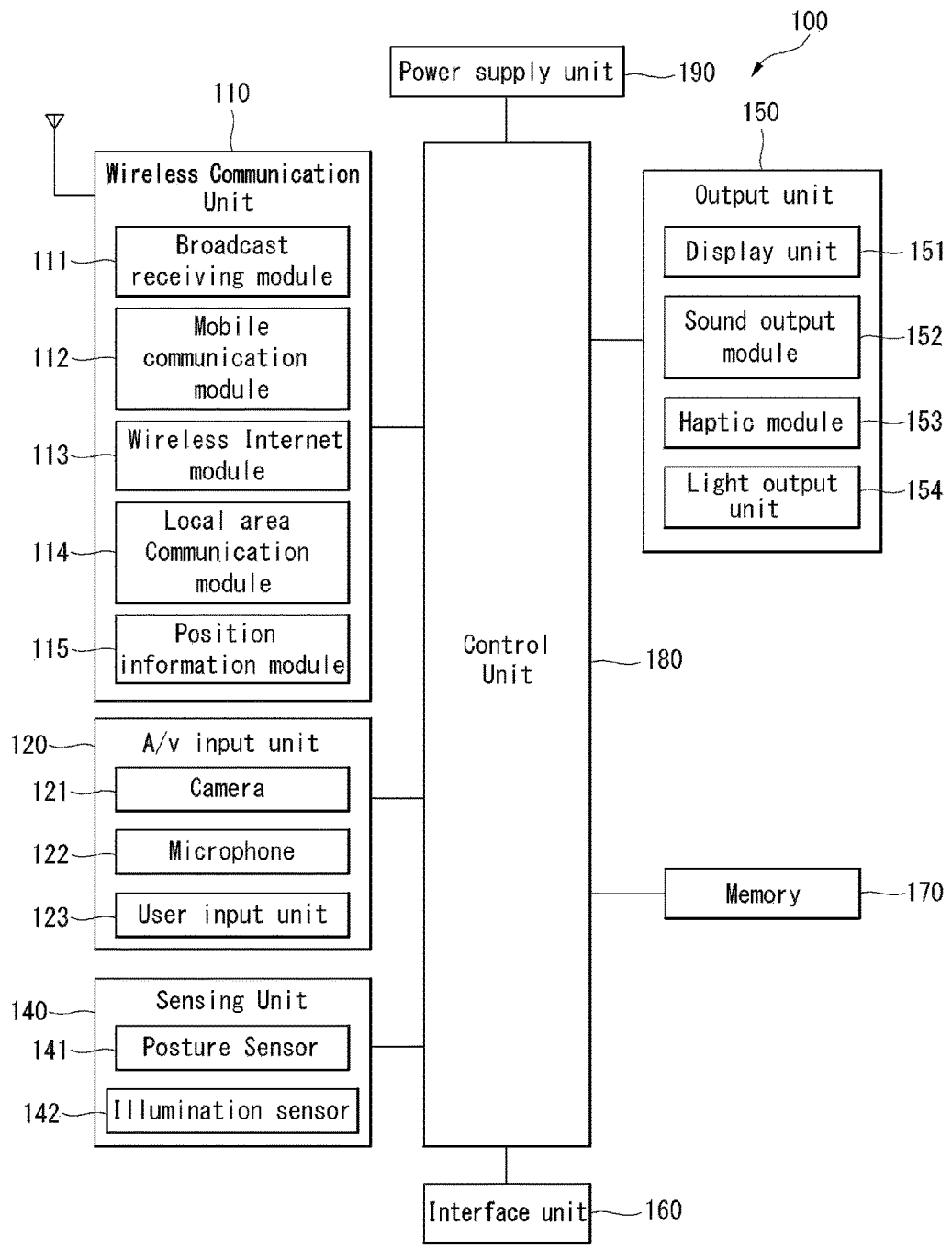
FIG. 1 is a block diagram of a mobile terminal according to an embodiment.

Reference is now made to FIG. 1, where FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 generally supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 2:
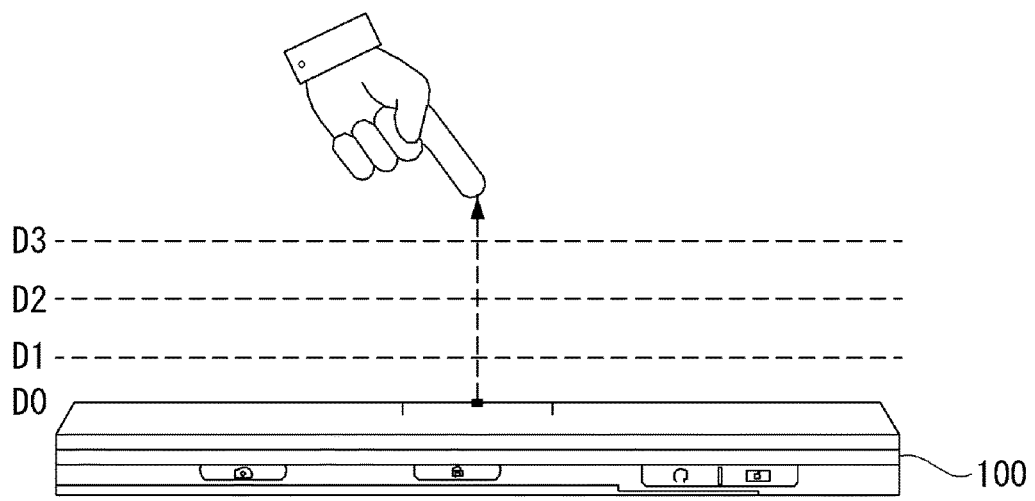
FIG. 2 is a view for explaining a proximity depth of a proximity sensor.

FIG. 2 is a view for explaining a proximity depth of a proximity sensor.

As shown in FIG. 2, when a pointer (such as a user's finger) approaches the touch screen, the proximity sensor located inside or near the touch screen may sense the approach of the pointer, and may output a proximity signal.

The proximity sensor may be constructed such that the proximity sensor outputs a proximity signal according to a distance between the pointer approaching the touch screen and the touch screen (referred to as "proximity depth").

The distance in which the proximity signal is output when the pointer approaches the touch screen may be referred to as a detection distance. The proximity depth may be determined by using a plurality of proximity sensors having different detection distances and by comparing proximity signals respectively output from the proximity sensors.

FIG. 2 shows a section of the touch screen in which proximity sensors capable of sensing three proximity depths may be provided. Proximity sensors capable of sensing less than three or more than four proximity depths may be provided in the touch screen.

More specifically, when the pointer completely contacts the touch screen (D0), it may be recognized as contact touch. When the pointer is located within a distance D1 from the touch screen, it may be recognized as a proximity touch of a first proximity depth.

When the pointer is located in a range between the distance D1 and a distance D2 from the touch screen, it may be recognized as a proximity touch of a second proximity depth. When the pointer is located in a range between the distance D2 and a distance D3 from the touch screen, it may be recognized as a proximity touch of a third proximity depth. When the pointer is located greater than the distance D3 from the touch screen, it may be recognized as cancellation of the proximity touch.

Accordingly, the controller 180 may recognize the proximity touch as various input signals according to proximity distance and proximity position of the pointer with respect to the touch screen, and the controller 810 may perform various operation controls according to the input signals.

Further preferred embodiments will be described in more detail with reference to additional drawing figures. It is understood by those skilled in the art that the present features can be embodied in several forms without departing from the characteristics thereof.

Hereinafter, in a description on an exemplary embodiment of the present invention, for convenience of description, it is assumed that the display unit 151 is the touch screen 151. As described above, the touch screen 151 may perform both an information display function and an information input function. However, the present invention is not limited thereto. Further, a touch described in this document may include both a contact touch and a proximity touch.

Figure 3:
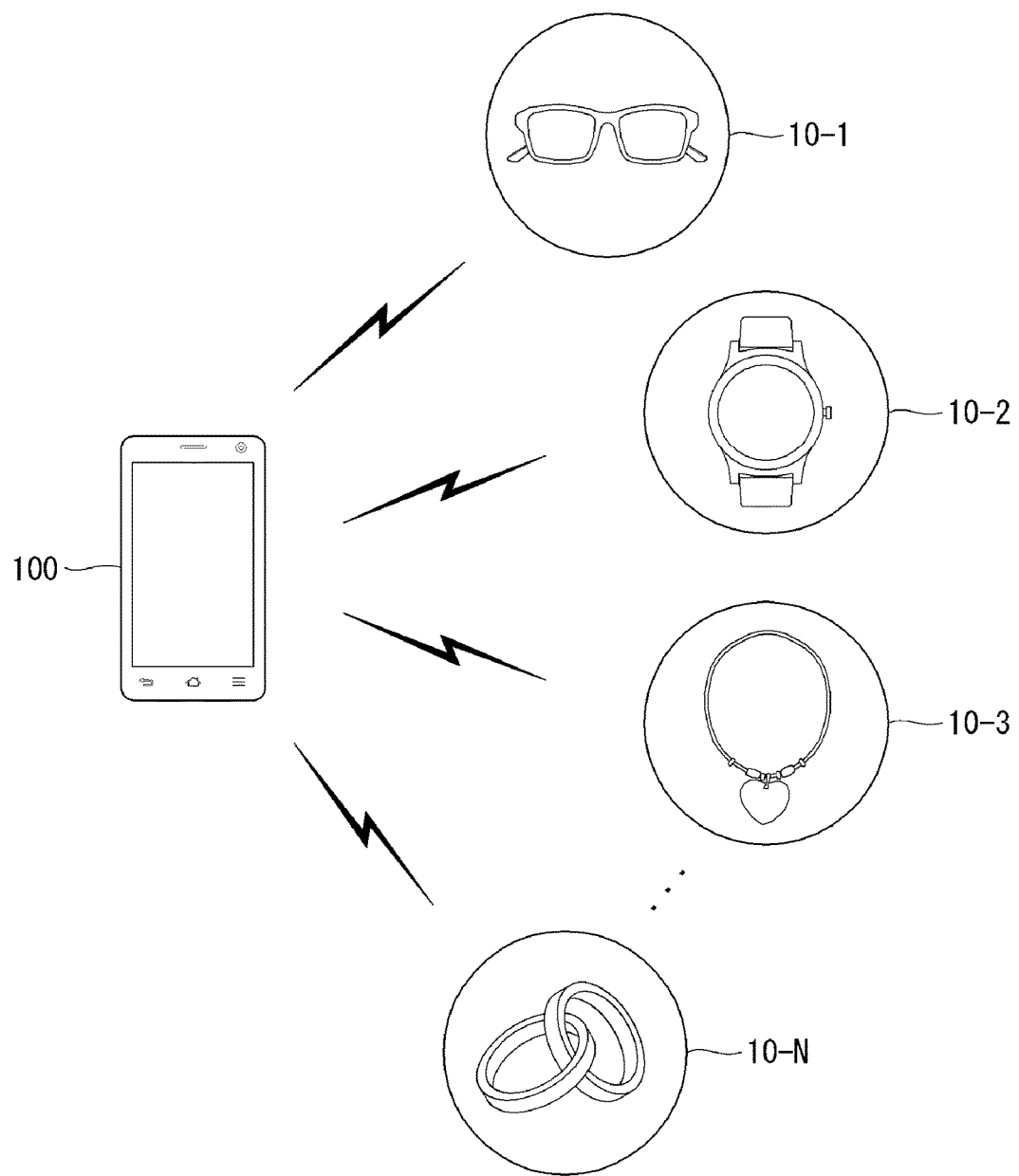
FIG. 3 is a use state diagram illustrating a method of controlling a mobile terminal related to the present invention.

FIG. 3 is a use state diagram illustrating a method of controlling a mobile terminal related to the present invention.

The mobile terminal 100 related to the present invention includes a short range communication module 114 and may support short range communication. In the following description, a case of using a Bluetooth™ communication method is illustrated. However, the present invention is not limited to a Bluetooth™ communication method and may be applied to a case of using communication methods such as WiFi, WiFi Direct, Near Field Communication (NFC), Wireless Universal Serial Bus (WUSB), Beacon, and Long Term Evolution UnLicensed Spectrum (LTEU). Further, for convenience, a case of using one communication method is illustrated, but the present invention may be applied to a plurality of communication methods.

The touch screen 151 of the mobile terminal 100 includes an indicator area that displays a state of the terminal. The indicator area is an area that displays a battery residual quantity, whether a network is connected, a time, and a notification message and may be distinguished from a screen display area (hereinafter, referred to a home screen H) in which an icon is displayed and in which a page is converted.

The mobile terminal 100 supporting Bluetooth communication may exchange data with various peripheral devices 10-1, 10-2, 10-3 . . . 10-N through Wireless Area Networks. Here, the short range communication module 114 providing a Bluetooth function that may be provided in various forms such as smart glasses 101, a smart watch 102, a smart necklace 103, or a smart ring 10N may detect (or recognize) peripheral devices 10-1, 10-2, 10-3 . . . 10-N that can communicate with the mobile terminal 100 at a periphery of the mobile terminal 100.

Further, when the detected peripheral devices 10-1, 10-2, 10-3 . . . 10-N are devices authenticated to communicate with the mobile terminal 100 according to an exemplary embodiment of the present invention, the controller 180 may transmit data processed in the mobile terminal 100 to peripheral devices 10-1, 10-2, 10-3 . . . 10-N through the short range communication module 114 or may transmit a control signal for removing a function of peripheral devices 10-1, 10-2, 10-3 . . . 10-N.

Accordingly, the user may control peripheral devices 10-1, 10-2, 10-3 . . . 10-N through the mobile terminal 100 to use an App executed in the peripheral devices 10-1, 10-2, 10-3 . . . 10-N or may use a function of the peripheral devices 10-1, 10-2, 10-3 . . . 10-N using an App used in the mobile terminal 100.

When the mobile terminal 100 provides a Bluetooth function, the controller 180 may display in an indicator area whether a Bluetooth function is activated. The indicator area is an area that generally displays a state of the mobile terminal, and the controller 180 may display a battery residual quantity, whether a network is connected, a time, and a notification message in the indicator area. Further, when a Bluetooth function is in an activation state, the controller 180 may display a Bluetooth icon in the indicator area.

When a Bluetooth function is in an activation state, the present invention may display a Bluetooth icon, and in a state in which a Bluetooth icon is displayed, the present invention may process a user input that is input to a predetermined specific area as an input for a Bluetooth control.

Figure 4:
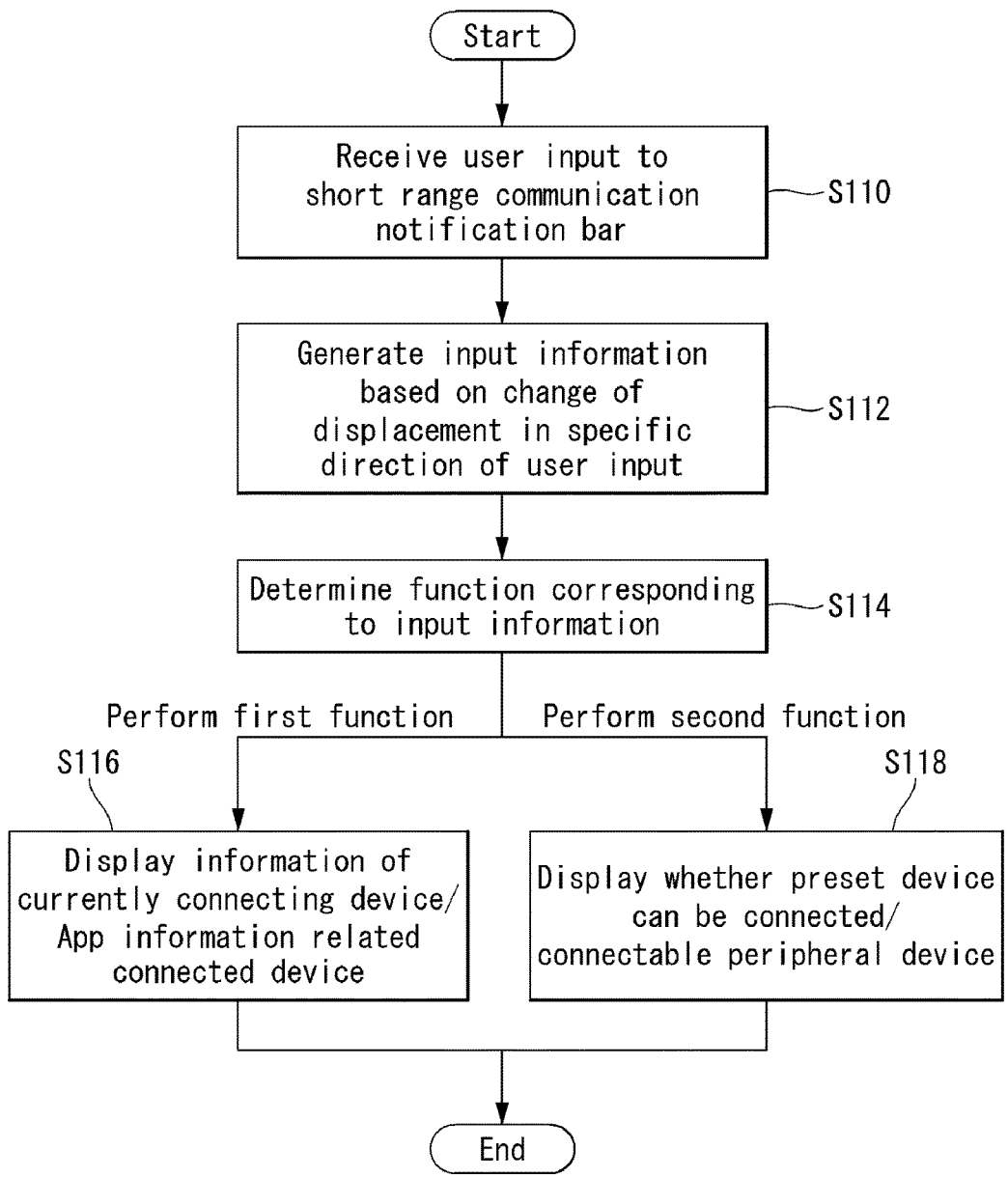
FIG. 4 is a flowchart illustrating a method of controlling a mobile terminal related to the present invention.

FIG. 4 is a flowchart illustrating a method of controlling a mobile terminal related to the present invention.

When a Bluetooth function is in an activation state, the controller 180 of the mobile terminal 100 according to an exemplary embodiment of the present invention may display a Bluetooth icon in an indicator area and receive a user input that is input through the indicator area (S110). By displaying a Bluetooth icon in the indicator area, the controller 180 may display that a Bluetooth function is in an activation state. When a Bluetooth icon is in a display state, the controller 180 may process a user input that is input to a predetermined specific area as an input for a Bluetooth control. For example, the controller 180 may process a user input to a Bluetooth icon or an indicator area in which a Bluetooth icon is displayed as an input for a Bluetooth control.

The controller 180 may generate user input information based on a change of a displacement in a specific direction of the user input (S112). The user input is a drag input started from the indicator area and may be processed as a displacement having a specific direction and a specific distance. The controller 180 may generate user input information according to a user drag direction and drag distance.

Thereafter, the controller 180 may determine a function to perform to correspond to the generated input information (S114). The controller 180 may perform a predetermined function according to the user drag distance. When the user drag distance is equal to or larger than a first reference distance, the controller 180 may perform a first function, and when the user drag distance is equal to or larger than a second reference distance, the controller 180 may perform a second function.

When performing a first function, the controller 180 may display whether a preset device or a frequent use device can be currently connected to Bluetooth and App information related to a corresponding device (S116).

When performing a second function, the controller 180 may scan and display a connectable peripheral adjacent device and display App information related to a corresponding device (S118).

Figure 5:
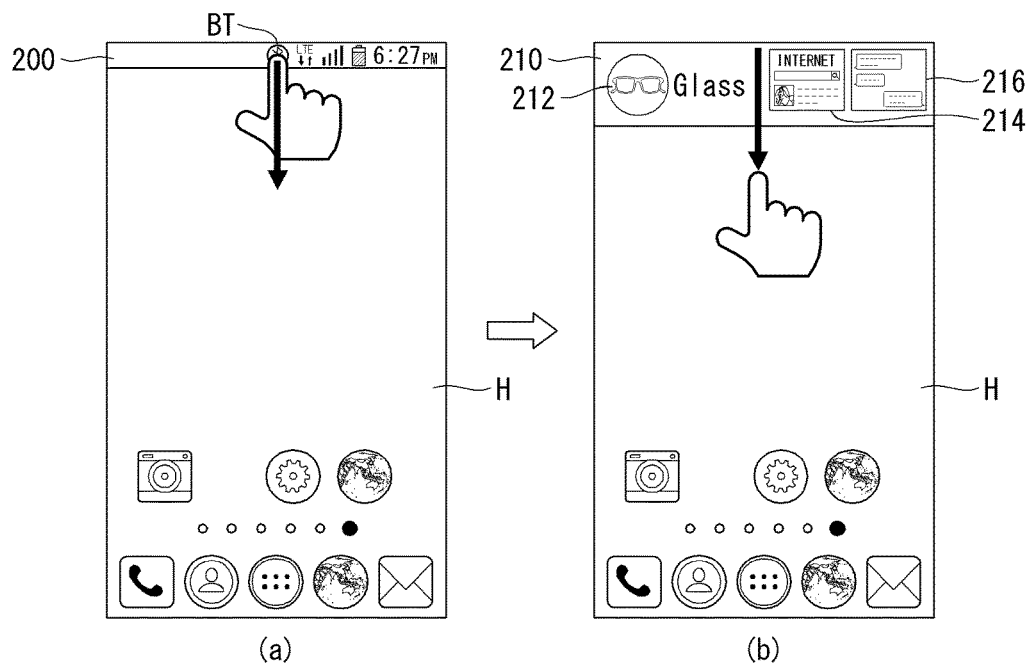
FIGS. 5 to 7 are diagrams illustrating a method of receiving a user input through an indicator area in a mobile terminal related to the present invention.
Figure 6:
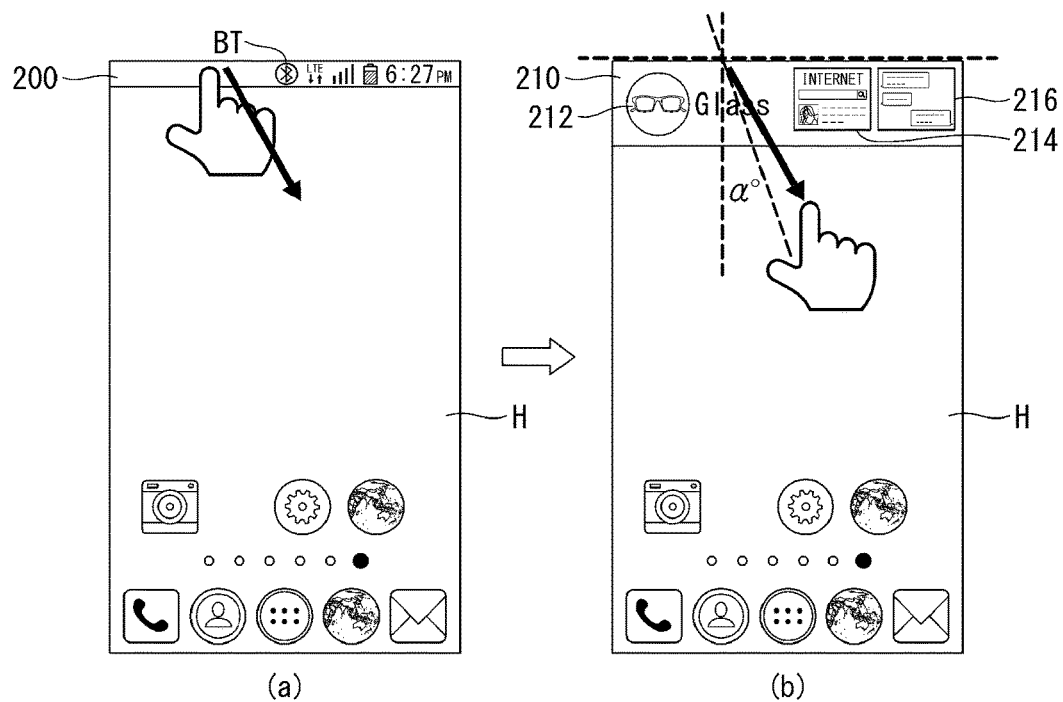
Figure 7:
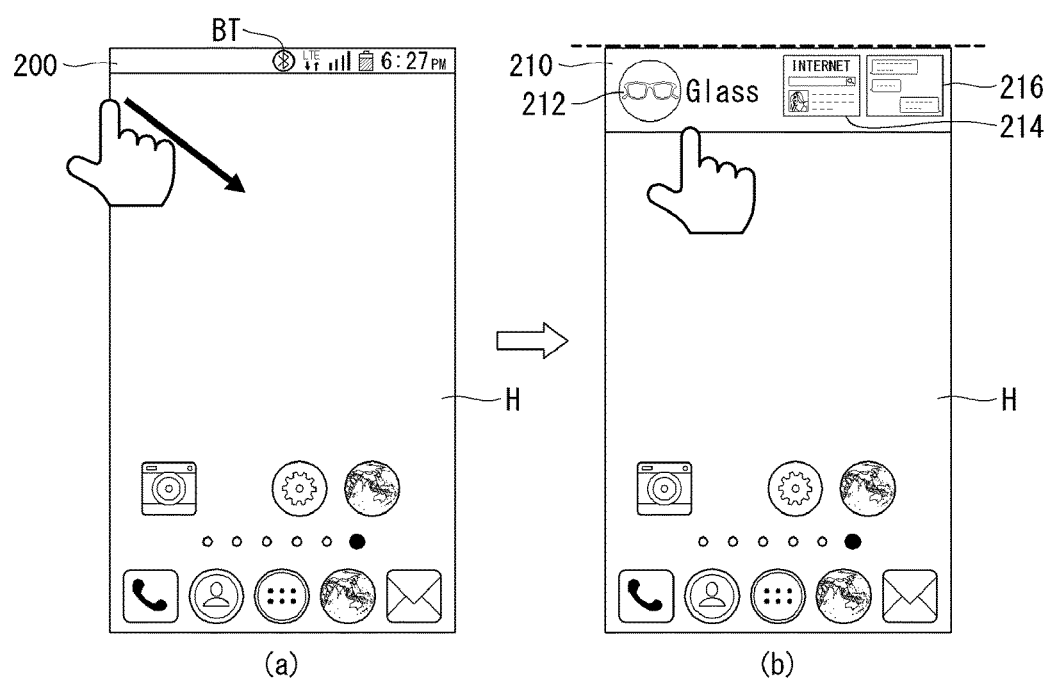

FIGS. 5 to 7 are diagrams illustrating a method of receiving a user input through a short range communication indicator area in a mobile terminal related to the present invention.

Referring to FIG. 5A, the touch screen 151 of the mobile terminal includes the indicator area 200 that displays a battery residual quantity, whether a network is connected, a time, and a notification message, and when a Bluetooth function is in an activated state, a Bluetooth icon BT is displayed in the indicator area 200.

Accordingly, when the user touches the indicator area 200 and drags a screen downward, contents displayed in the existing indicator area 200 may be displayed. When the user touches the Bluetooth icon BT and drags the Bluetooth icon BT in a downward direction of the screen, a window 210 representing a Bluetooth state may be displayed, as shown in FIG. 5B.

In exemplary embodiments, contents displayed in the existing indicator area 200 means contents that display notification information such as display, phone call, text message, and Social Network Service (SNS) of icons for activating or deactivating a function such as WiFi, position information, a vibration, and a rotation when an existing user touches the indicator area 200 and drags in a downward direction of a screen.

In the window 210 representing a Bluetooth state, an icon 212 of a preset Bluetooth device or a frequent use Bluetooth device and information of Apps 214 and 216 available by interworking with a corresponding device may be displayed.

FIG. 6 is a diagram illustrating a method of receiving a user input according to a user drag direction and illustrates an example of displaying contents displayed in the existing indicator area 200 according to a user drag angle or displaying the Bluetooth window 210 of the present invention.

When the user drag angle is smaller than α°, which is a reference angle based on a vertical line, the controller 180 may perform the same function as that of the existing indicator area, and when the user drag angle is larger than α°, which is a reference angle, the controller 180 may display the Bluetooth window 210 of the present invention, as shown in a screen of FIG. 6B.

Accordingly, when the user drag angle is larger than α° while using a function of an existing indicator area, the controller 180 may provide the Bluetooth window 210.

FIG. 7 illustrates an example of displaying contents displayed in an existing indicator area according to a start position of a user drag instead of a drag angle or displaying the Bluetooth window 210 of the present invention When a user drag is started from an upper end bezel, the controller 180 may perform the same function as that of the existing indicator area, and when a user drag is started from a side bezel, the controller 180 may display the Bluetooth window 210 of the present invention, as shown on a screen of FIG. 7B.

Accordingly, when a start position of a user drag is a side bezel while using a function of an existing indicator area, the controller 180 may provide the Bluetooth window 210.

Figure 8:
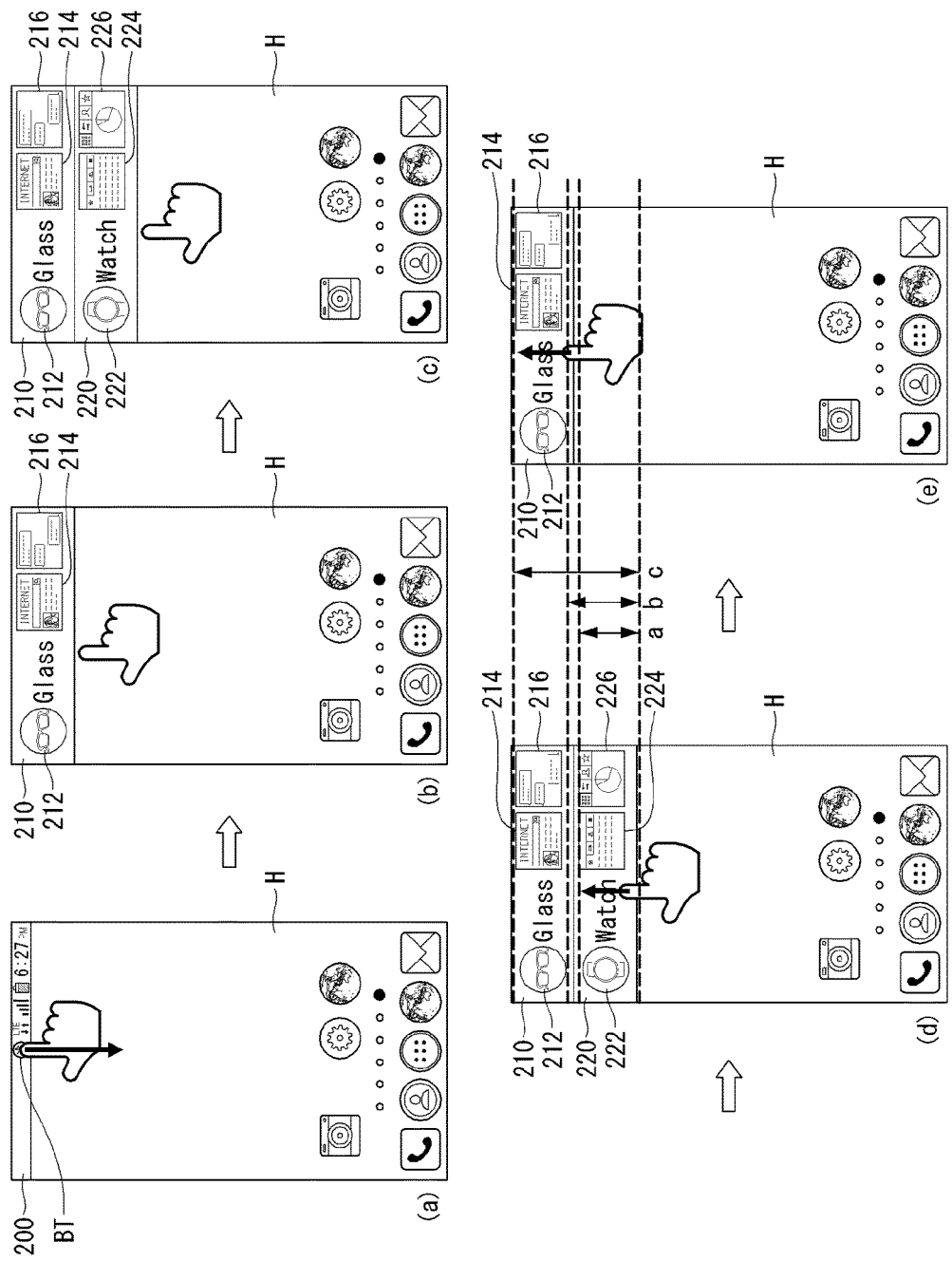
FIGS. 8 to 25 are diagrams illustrating a method of controlling a short range communication function according to a first exemplary embodiment of the present invention.

FIG. 8 illustrates a method of receiving a user input according to a user drag distance and illustrates an example of displaying a Bluetooth related function according to a first reference distance a, a second reference distance b, and a third reference distance c. Here, a relation of each reference distance may be set according to a designer's design method, and for example, the second reference distance b may be equal to or larger than the first reference distance a (a<=b), and the third reference distance c may be equal to or larger than two times of the second reference distance b (2*b=c).

As shown in FIG. 8A, when a user drag input is received in the indicator area 200 in which the Bluetooth icon BT is displayed, the mobile terminal 100 may display a first Bluetooth window 210, as shown in FIG. 8B. The controller 180 may gradually enlarge and display a display area of the first Bluetooth window 210 by interworking with a user drag input length. As the first Bluetooth window 210 is enlarged, the controller 180 may show currently connected Bluetooth devices and display an icon 212 of a preset Bluetooth device or a frequent use Bluetooth device and information of Apps 214 and 216 available by interworking with the corresponding device. The first Bluetooth window 210 shown in FIG. 8B illustrates a case of displaying a glasses icon 212 in order to display a state connected to glasses. Thereafter, when a drag input larger than the first reference distance a and smaller than the second reference distance b is received, and as shown in FIG. 8C, a second Bluetooth window 220 may be further displayed. The controller 180 may gradually enlarge and display a display area of the second Bluetooth window 220 by interworking with a user drag input length.

In the second Bluetooth window 220, an icon 222 of the Bluetooth device and information of Apps 224 and 226 available by interworking with the corresponding device may be displayed. For example, an App within a terminal such as a heartbeat monitoring App and a sports App related to a Bluetooth device of a wearable form may be displayed. The second Bluetooth window 220 shown in FIG. 8C illustrates a case of displaying a watch icon 222 in order to display a state connected to the watch.

In exemplary embodiments of the present invention, an App available by interworking with a corresponding device or an App executed in a corresponding device may be an App executed in a mobile terminal by interworking with a corresponding device or may be an App directly executed in a corresponding device. When an App is executed in a corresponding device, the App is actually executed in the corresponding device, but the mobile terminal may display an execution screen.

The controller 180 may display the icons 212 and 222 of the device in recent use order, recently connected order, or frequently use order in the Bluetooth windows 210 and 220. For example, when a most recently connected Bluetooth device is glasses and a device connected immediately before the most recently connected Bluetooth device is a watch, as shown in FIG. 8C, the controller 180 may display the glasses icon 212 in the first displayed first Bluetooth window 210 and display the watch icon 222 in the additionally displayed second Bluetooth window 220 according to a user drag.

The controller 180 may display information of Apps 224 and 226 available by interworking with a corresponding device together with the icons 212 and 222 of the device. App information may be displayed in a form of a name, an icon, or an execution screen of the App. When displaying a plurality of Apps, the controller 180 may display App information in recent use order, recently connected order, or frequently use order. For example, when the user connects and uses glasses, if a first App (e.g., Internet) was most recently used and if a second App (e.g., messenger) was used immediately before the most recently used App, information of the first App 214 and the second App 216 together with the glasses icon 212 may be sequentially displayed. Further, information of the first App 224 and the second App 226, which are Apps used when the user connects and uses a watch may be sequentially displayed together with the watch icon 222 in recent use order. Referring to FIG. 8D, in a state in which the first Bluetooth windows 210 and the second Bluetooth window 220 are displayed, when the user performs a drag input in a backward direction, the controller 180 detects a direction and a distance of the input. When a drag input of a backward direction is performed by a length of the second Bluetooth window 220, the controller 180 may maintain a state that hides only the second Bluetooth window 220, as shown in FIG. 8E. Here, when a backward drag distance is further enlarged to the indicator area 200 side, the screen state returns to a state of FIG. 8A, and the controller 180 may hide the Bluetooth window 210 and display the indicator area 200 in which a Bluetooth icon BT is displayed.

Figure 9:
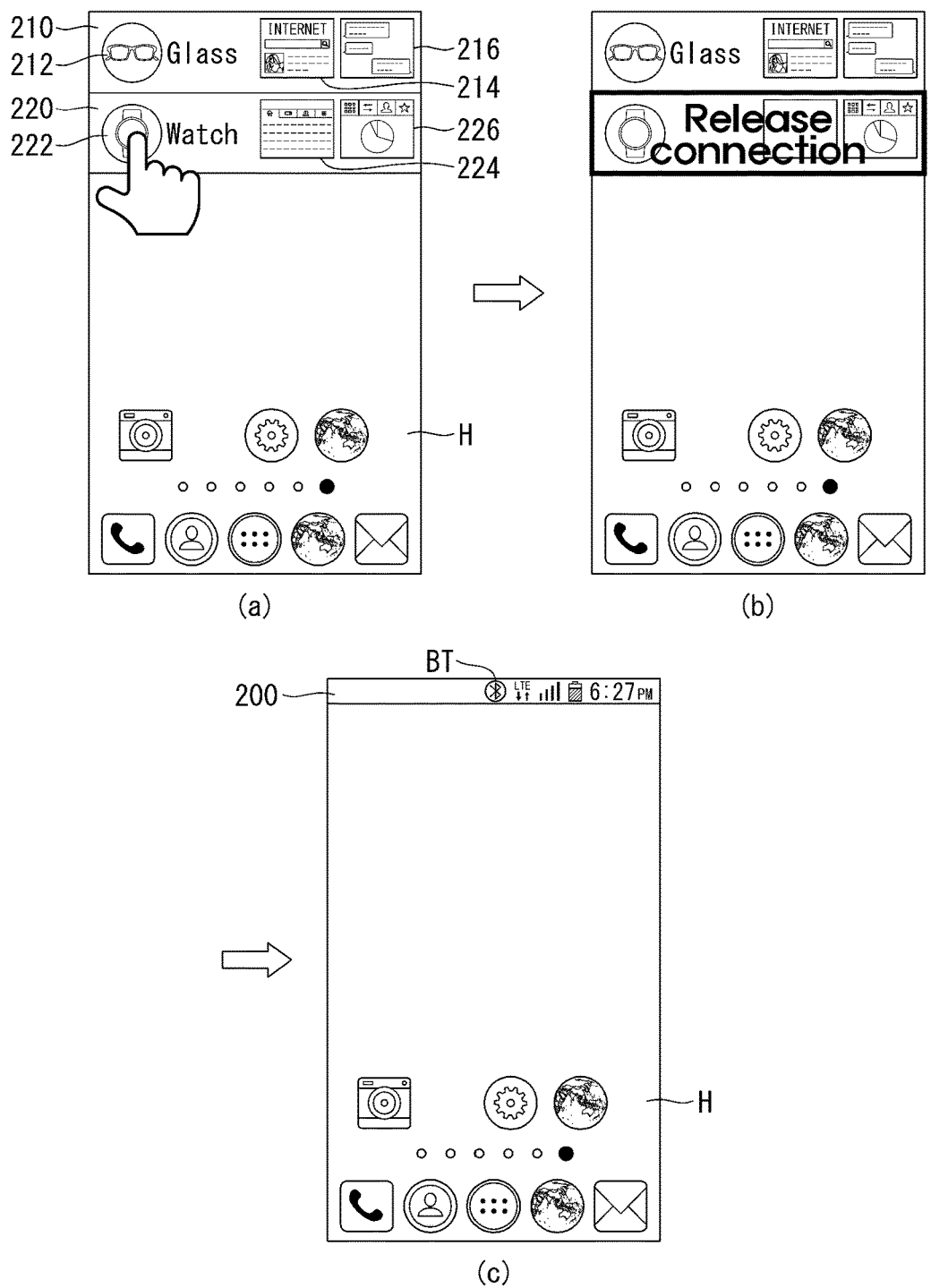

FIG. 9 illustrates a process of controlling a function of a Bluetooth device using the Bluetooth windows 210 and 220 displayed on a screen of FIG. 8C and illustrates a process of performing a connection to the Bluetooth device.

Referring to FIG. 9A, in the first Bluetooth window 210, an icon 212 of the first device and Apps 214 and 216 available in the first device are displayed, and in the second Bluetooth window 220, an icon 222 of the second device and Apps 224 and 226 available in the second device may be displayed.

Here, when the user releases a touch by moving upward an icon of a specific device, for example, an icon 222 of the second device, a connection to the second device, which is the corresponding device is released. When a connection is released, as shown in FIG. 9B, a connection release message is displayed and as shown in FIG. 9C, a home screen H may be displayed.

As described above, when the controller 180 displays information of a Bluetooth device according to a user drag input and receives an input of user selection to the displayed Bluetooth device information, the controller 180 connects or release Bluetooth to a corresponding device. Accordingly, the user may determine whether the corresponding device is connected to the Bluetooth device and easily perform a series of process of connecting or releasing Bluetooth communication with a corresponding Bluetooth device with only a continuous drag action. Accordingly, the user may easily determine and connect a Bluetooth device to use without a process of selecting a specific menu or converting a screen.

Figure 10:
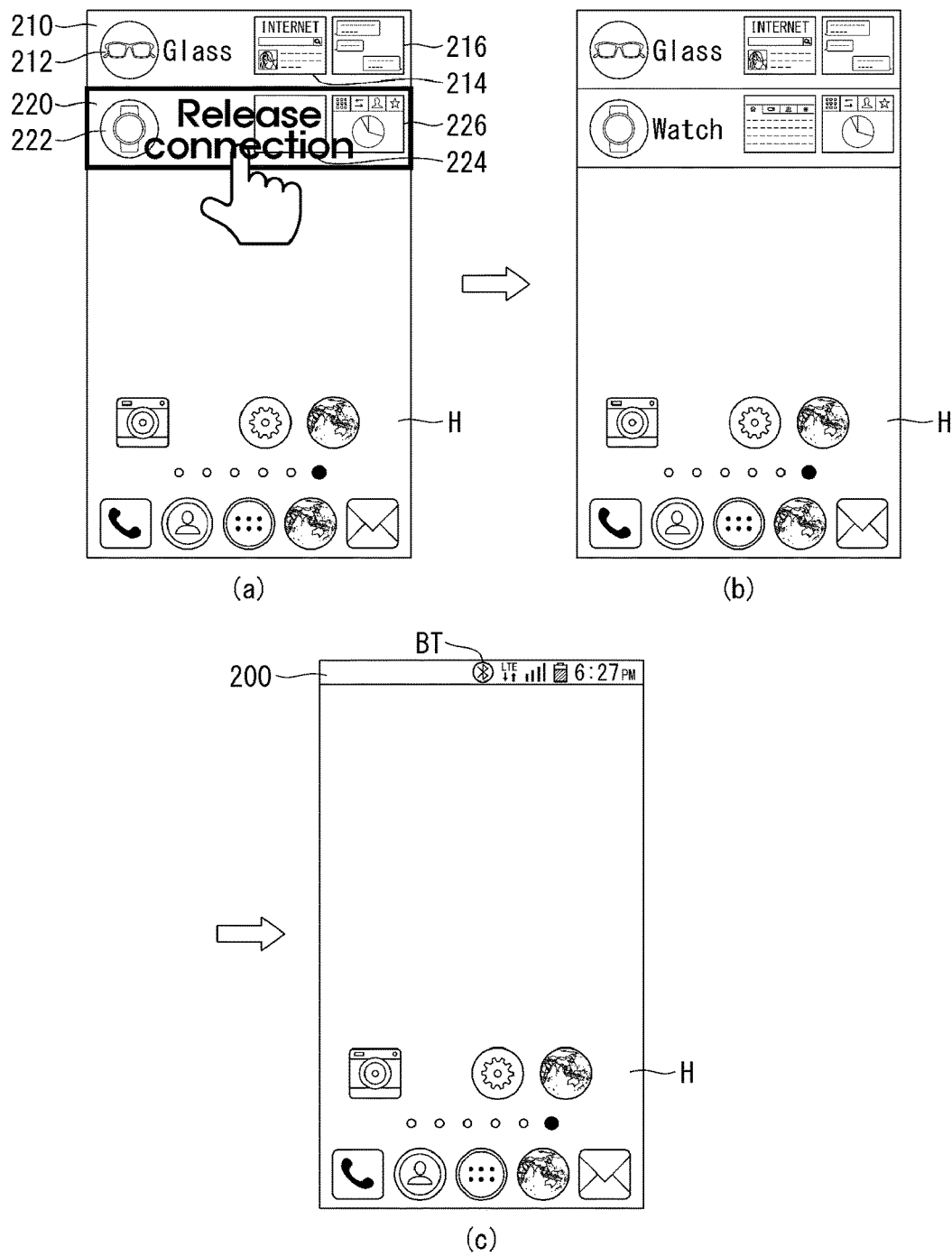

FIG. 10 illustrates a control process after a screen of FIG. 9B, and in a state in which a connection release message is displayed, as shown in FIG. 10A, when a corresponding area is touched, a connection release instruction is cancelled and thus as shown in FIG. 10B, a connection release message is disappeared, and as shown in FIG. 10C, a home screen H is displayed.

Figure 11:
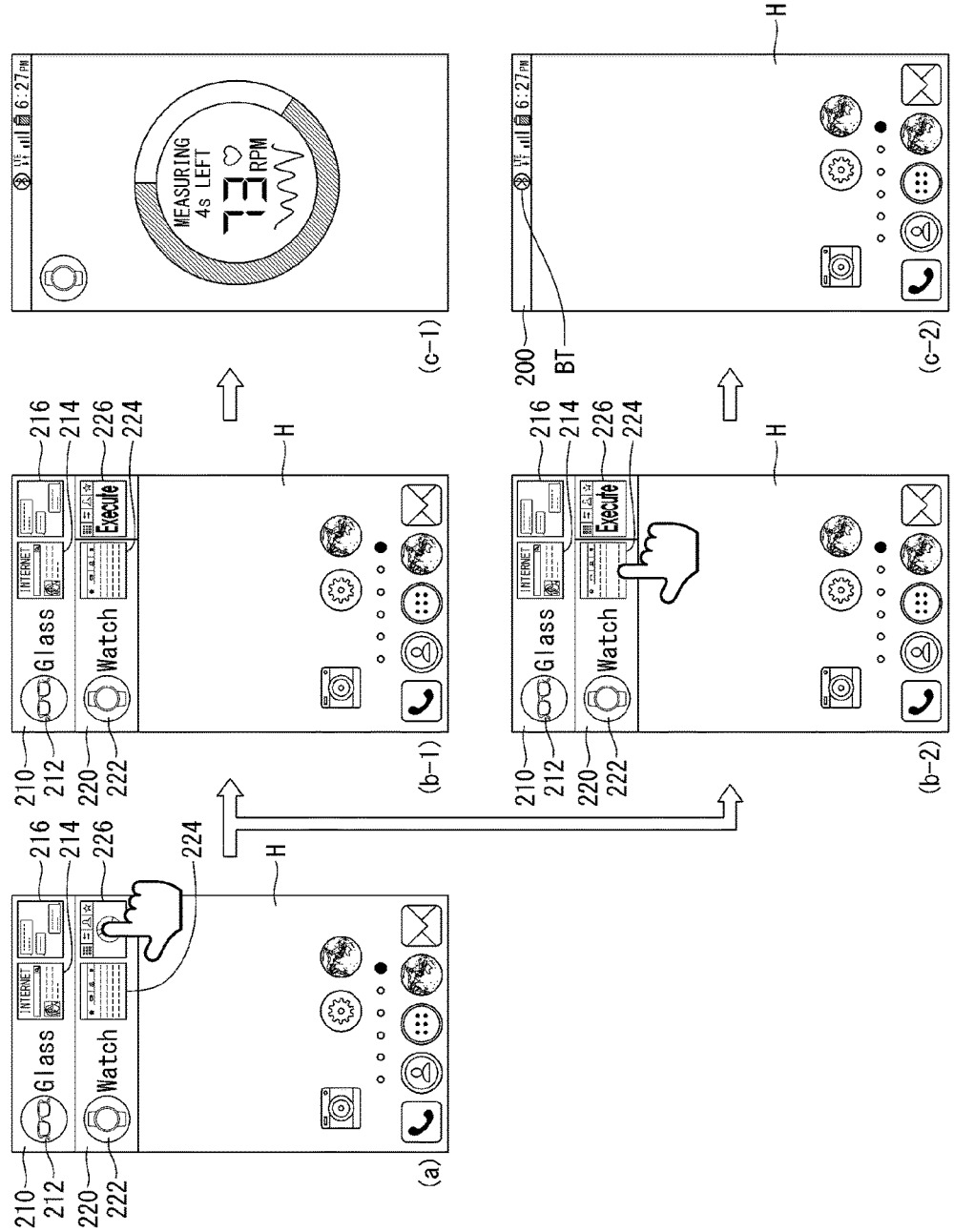

FIG. 11 illustrates a process of controlling a function of the Bluetooth device using the Bluetooth windows 210 and 220 displayed on a screen of FIG. 11A and illustrates a case of executing or terminating an App related to the Bluetooth device.

Referring to FIG. 11A, the controller 180 may display an icon 212 of the first device and Apps 214 and 216 available in the first device in the first Bluetooth window 210 and display an icon 222 of the second device and Apps 224 and 226 available in the second device in the second Bluetooth window 220.

Here, when the user releases a touch by moving upward an App of a specific device, for example, the second App 226 of the second device, the controller 180 executes the second App 226 executed in a corresponding device selected by the user and displays a message notifying that the App is executed, as shown in b-1. The controller 180 may display a message notifying execution of the App for a predetermined time and display an execution screen of a corresponding App, as shown in c-1.

The second App 226 is executed and as shown in b-1, in a state in which a message notifying execution of the App is displayed, as shown in b-2, when the user performs a touch input, an App execution instruction is cancelled. As shown in b-1, in a state in which a message notifying execution of the App is displaying, as shown in b-2, when the user touch input is received, the controller 180 recognizes that an App execution instruction is cancelled.

When App execution is cancelled by the user touch input of b-2, the controller 180 may cancel App execution and display a home screen H, as shown in c-2.

Figure 12:
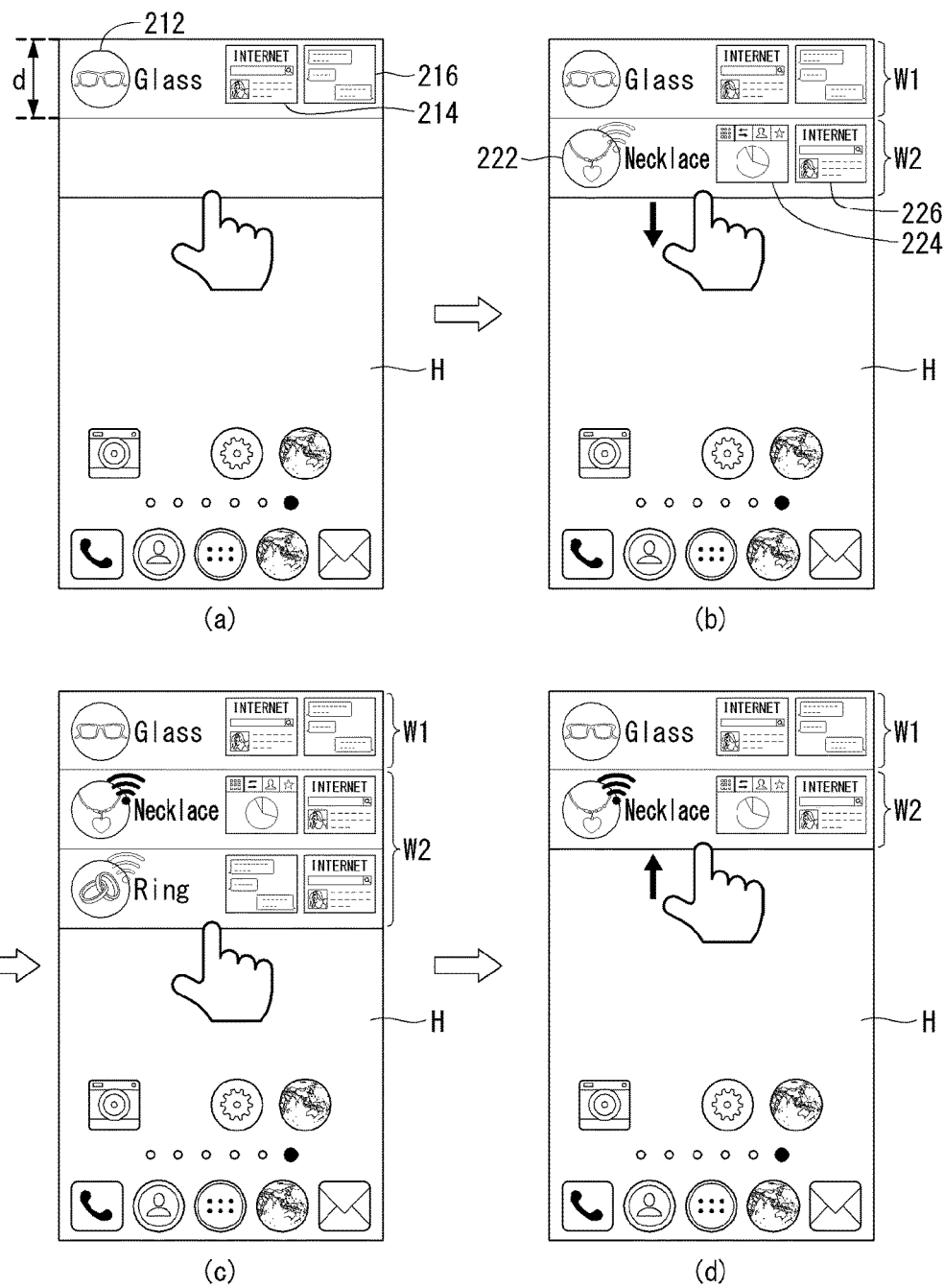

FIG. 12 illustrates a case of displaying a first window W1 that displays information of a currently connecting Bluetooth device and a second window W2 that displays information of a connectable device according to a user drag input distance.

Referring to FIG. 12A, when the controller 180 receives a user drag input in the indicator area 200 in which the Bluetooth icon BT is displayed, the controller 180 displays the first window W1 that displays information of a currently connecting Bluetooth device. In the first window W1, an icon 212 of a currently connecting Bluetooth device and information of Apps 214 and 216 that can be executed in a corresponding device may be displayed.

Referring to FIG. 12B, when the user drag input distance is equal to or larger than a predetermined distance d, the controller 180 displays information 222 of an unconnected Bluetooth device and information of Apps 224 and 226 that can be executed in a corresponding device in the second window W2. An unconnected device displayed in the second window W2 may include a frequent use device or a recently connected device. Here, the controller 180 may scan an unconnected device and display whether the unconnected device may be currently connected.

Referring to FIG. 12C, when the user drag input distance is equal to or larger than a predetermined distance d, the controller 180 may display information of a plurality of Bluetooth devices and information of an App that can be executed in a corresponding device in the second window W2. The controller 180 may scan an unconnected device and display whether the unconnected device may be currently connected. For example, a white electric wave display may mean a state that cannot be connected, and a black electric wave display may mean a state that can be connected.

Thereafter, when the user drag input is performed in a backward direction, as shown in FIG. 12D, the controller 180 may reduce a size of the second window W2 by interworking with the user drag distance.

Figure 13:
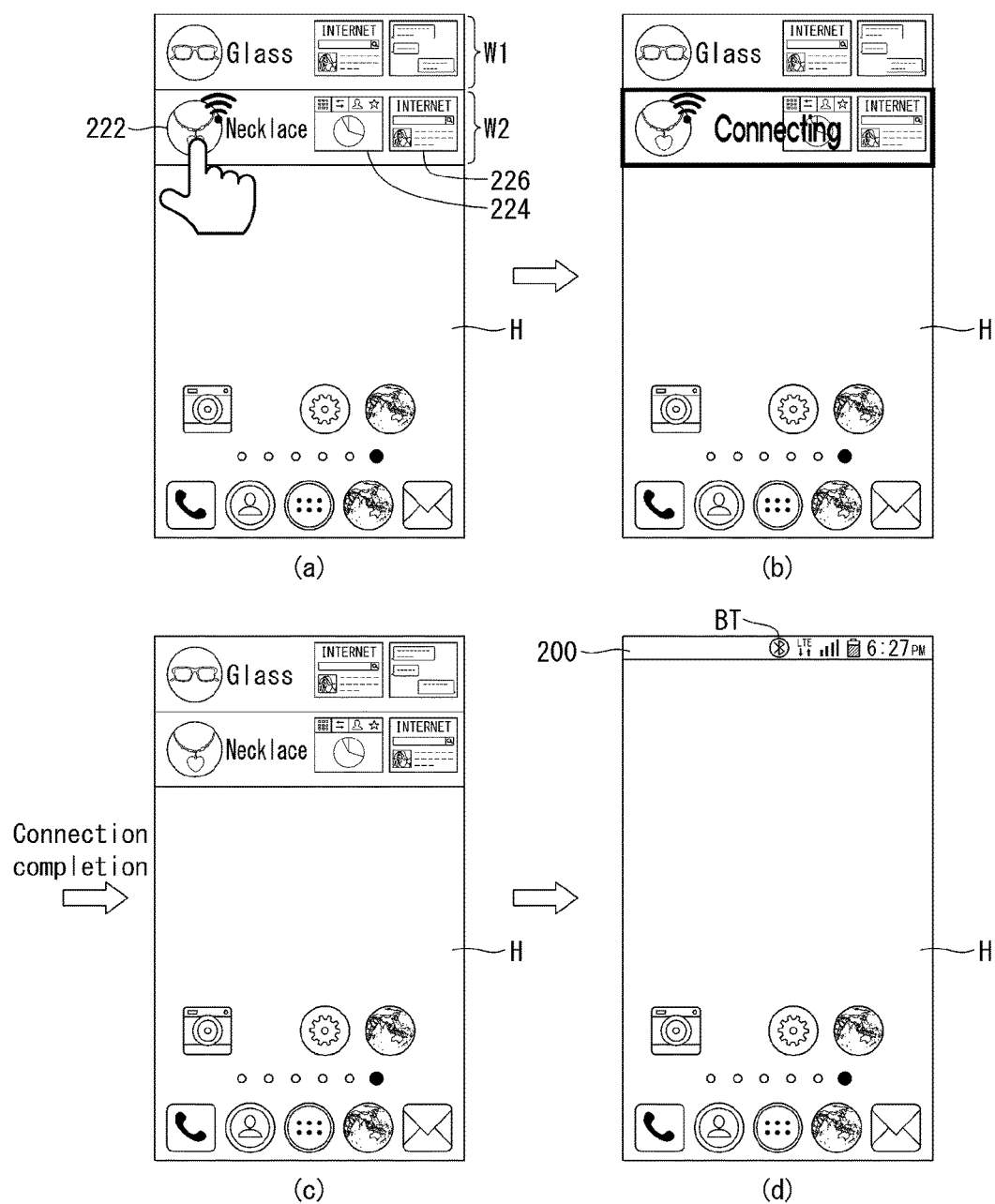
Figure 14:
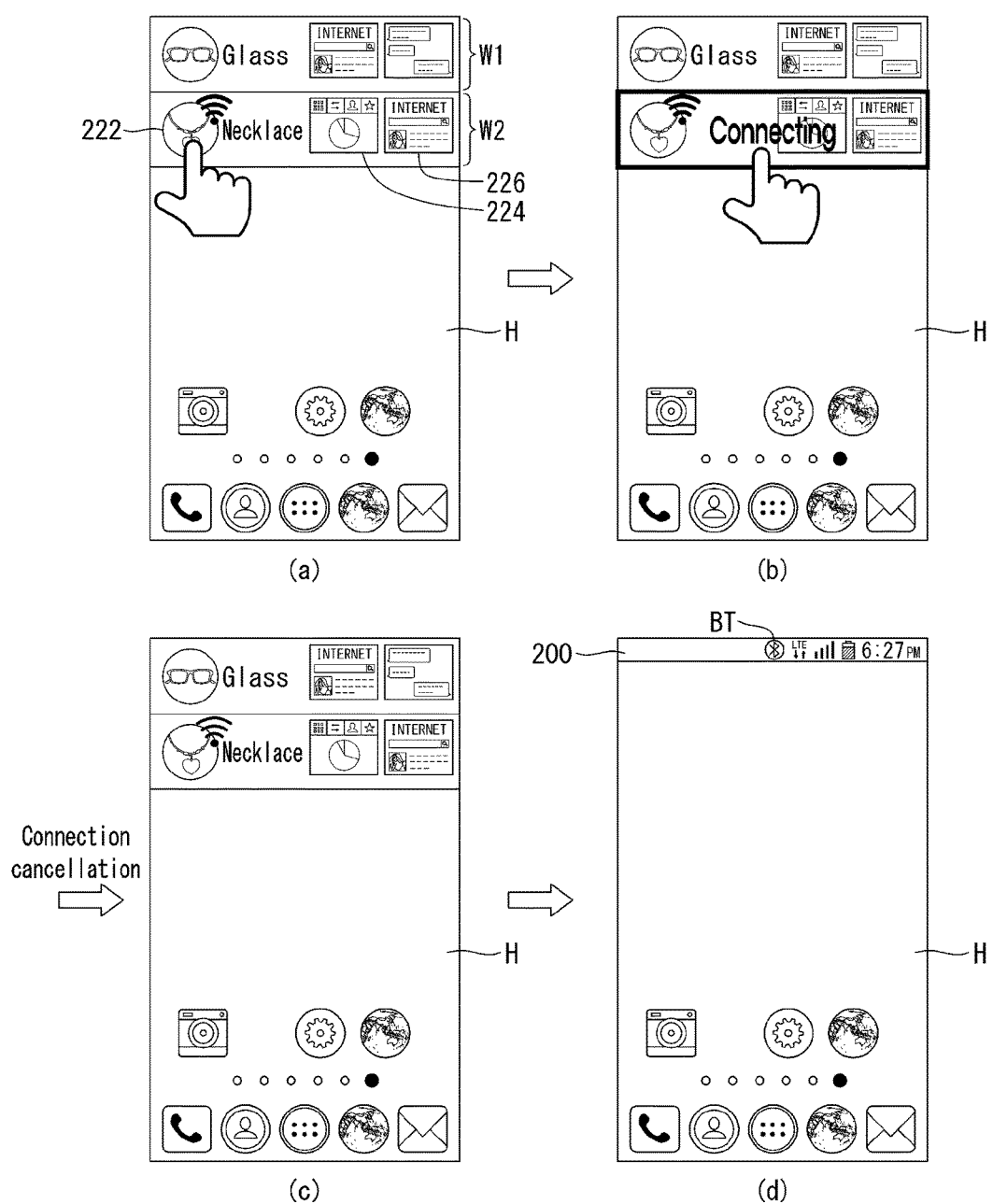

FIGS. 13 and 14 illustrate a control process after a screen of FIG. 12B and illustrate a process of performing connection or connection cancellation to a Bluetooth device using the second window W2 that displays information of a connectable device.

FIG. 13 illustrates a connection process to the Bluetooth device, and referring to FIG. 13A, the controller 180 may display information 222 of the Bluetooth device that is not connected to the second window W2 and information of Apps 224 and 226 that can be executed in a corresponding device. An unconnected device displayed in the second window W2 may include a frequent use device or a recently connected device. Here, the controller 180 may scan an unconnected device to display whether the unconnected device can be currently connected.

Here, when the user releases a touch by upward moving an icon 222 of the second device displayed as a connectable device, the controller 180 performs a connection to the corresponding second device and displays a message notifying that the corresponding second device is connecting, as shown in FIG. 13B.

When a connection to the second device is complete, the controller 180 may display a connection state, as shown in FIG. 13C and display a home screen H, as shown in FIG. 13D.

After the second window W2 is displayed, a series of process of connecting Bluetooth communication to the second device using an icon 222 of the second device may be continuously performed by a user drag. Accordingly, the user may easily determine and connect a Bluetooth device to use without a process of selecting a specific menu or converting a screen.

FIG. 14 illustrates a process of performing connect cancellation, and referring to FIG. 14A, when the user releases a touch by upward dragging an icon 222 of the second device displayed as a connectable device in the second window W2, the controller 180 processes the corresponding user input, performs a connection to the second device, and displays a message notifying that second device is connecting.

In a state in which a message notifying connecting is displayed, as shown in FIG. 14B, when the user performs a touch input, the controller 180 processes a corresponding user input as a connection cancellation instruction. When the connection cancellation instruction is received, the controller 180 may cancel a connection attempt, stop displaying a message notifying connecting, as shown in FIG. 14C, and display a home screen H after a predetermined time has elapsed, as shown in FIG. 14D.

Figure 15:
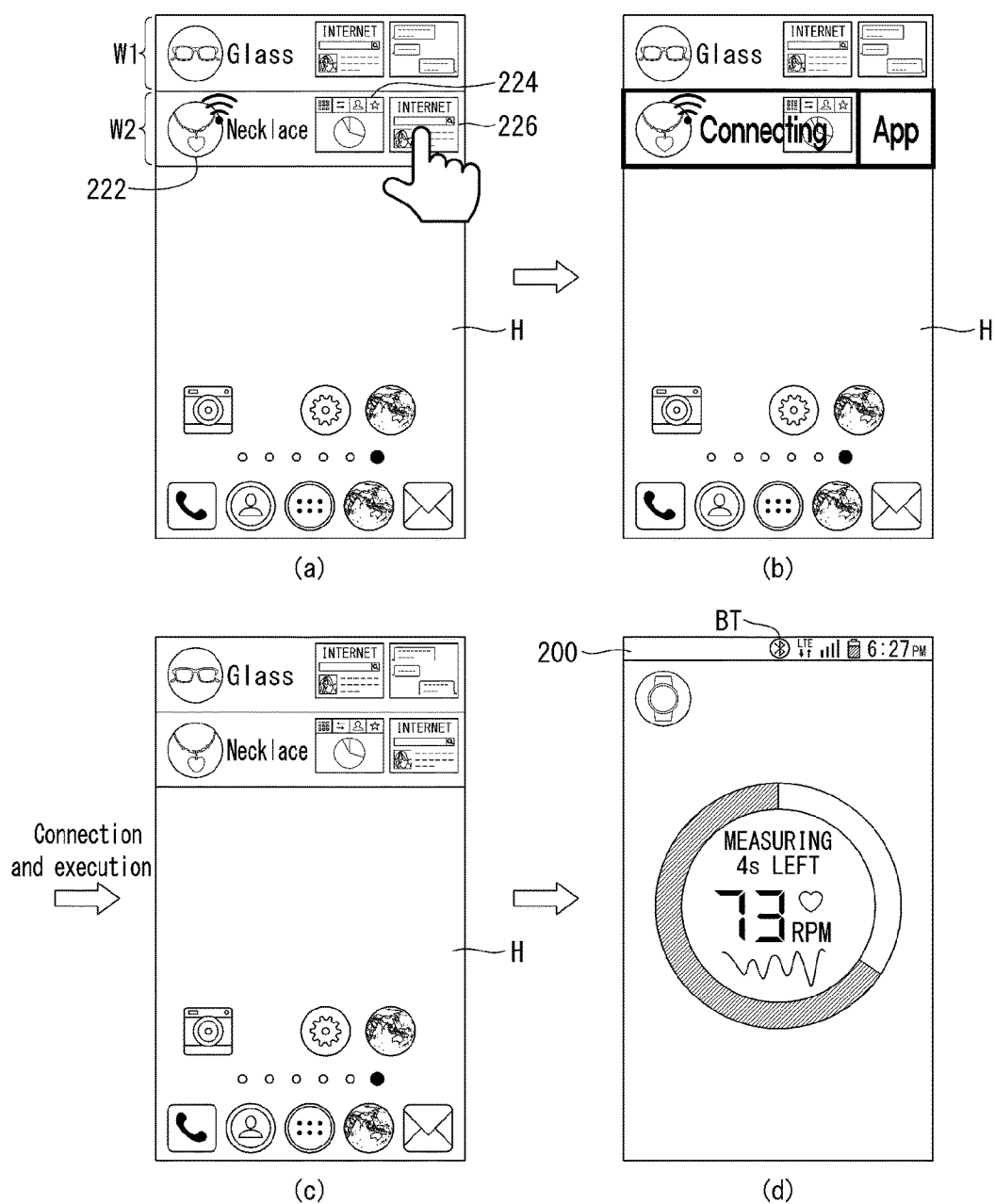

FIG. 15 illustrates a control process after a screen of FIG. 12B and illustrates a process of simultaneously performing a connection to a Bluetooth device and execution of an App using the second window W2 that displays information of connectable devices.

FIG. 15 illustrates a process of simultaneously performing a connection to a Bluetooth device and execution of an App, and referring to FIG. 15A, the controller 180 may display information 222 of a Bluetooth device that is not connected to the second window W2 and information of Apps 224 and 226 that can be executed in a corresponding device. Unconnected devices displayed in the second window W2 may include a frequent use device or a recently connected device. Here, the controller 180 may scan an unconnected device and display whether the unconnected device may be currently connected.

Here, when the user releases a touch by upward moving an icon 226 of a second App executed in the second device displayed as a connectable device, the controller 180 performs a connection to the corresponding second device and prepares execution of the second App. Accordingly, as shown in FIG. 15B, the controller 180 displays a message notifying that a connection to the corresponding second device is performed and that the corresponding second device is connecting and a message notifying execution of the corresponding App.

When a connection to the second device is complete and when the corresponding App is executed, the controller 180 may display a connection state, as shown in FIG. 15C, and display an execution screen of the second App, as shown in FIG. 15D.

Through the foregoing configuration, after the second window W2 is displayed, the user may select a connection to the second device and execution of the second App through a series of actions of releasing a touch in an icon 226 of the second App.

Figure 16:
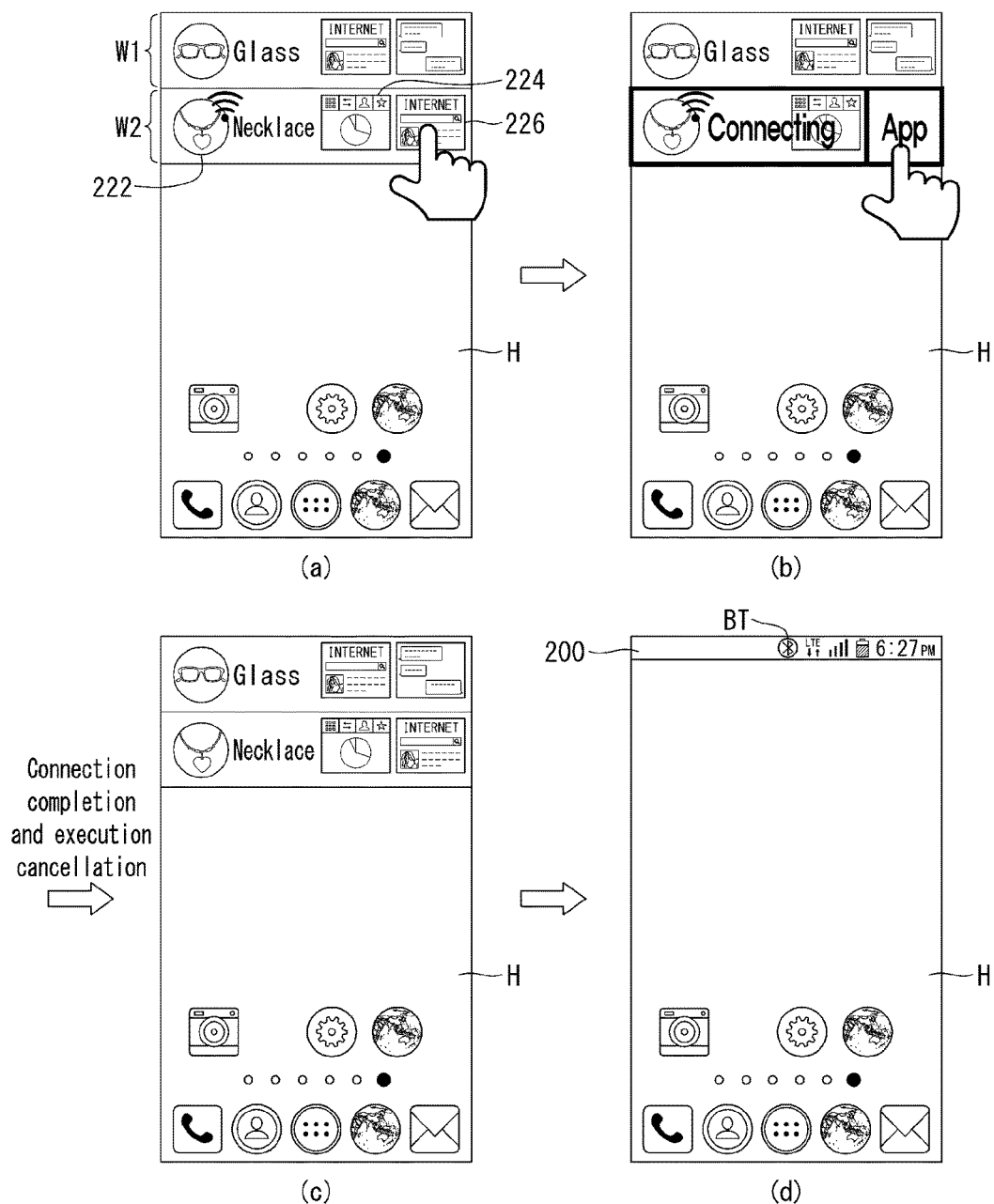

FIG. 16 illustrates a process of performing execution cancellation of an App.

Referring to FIG. 16A, when the user releases a touch by moving upward an icon 226 of a second App executed in the second device displayed as a connectable device, the controller 180 performs a connection to the corresponding second device and prepares execution of the second App. A message notifying that a connection to the second device is performed and that the second device is connecting and a message notifying execution of a corresponding App are displayed.

Thereafter, as shown in FIG. 16B, in a state in which connecting and an App execution message are displayed, when the user performs a touch input, the controller 180 determines the user input to an App execution instruction.

Accordingly, after a connection to the second device is complete, as shown in FIG. 16C, the controller 180 may display a connection state to the second device, display executable App information, and display a home screen H after a predetermined time has elapsed, as shown in FIG. 16D.

Figure 17:
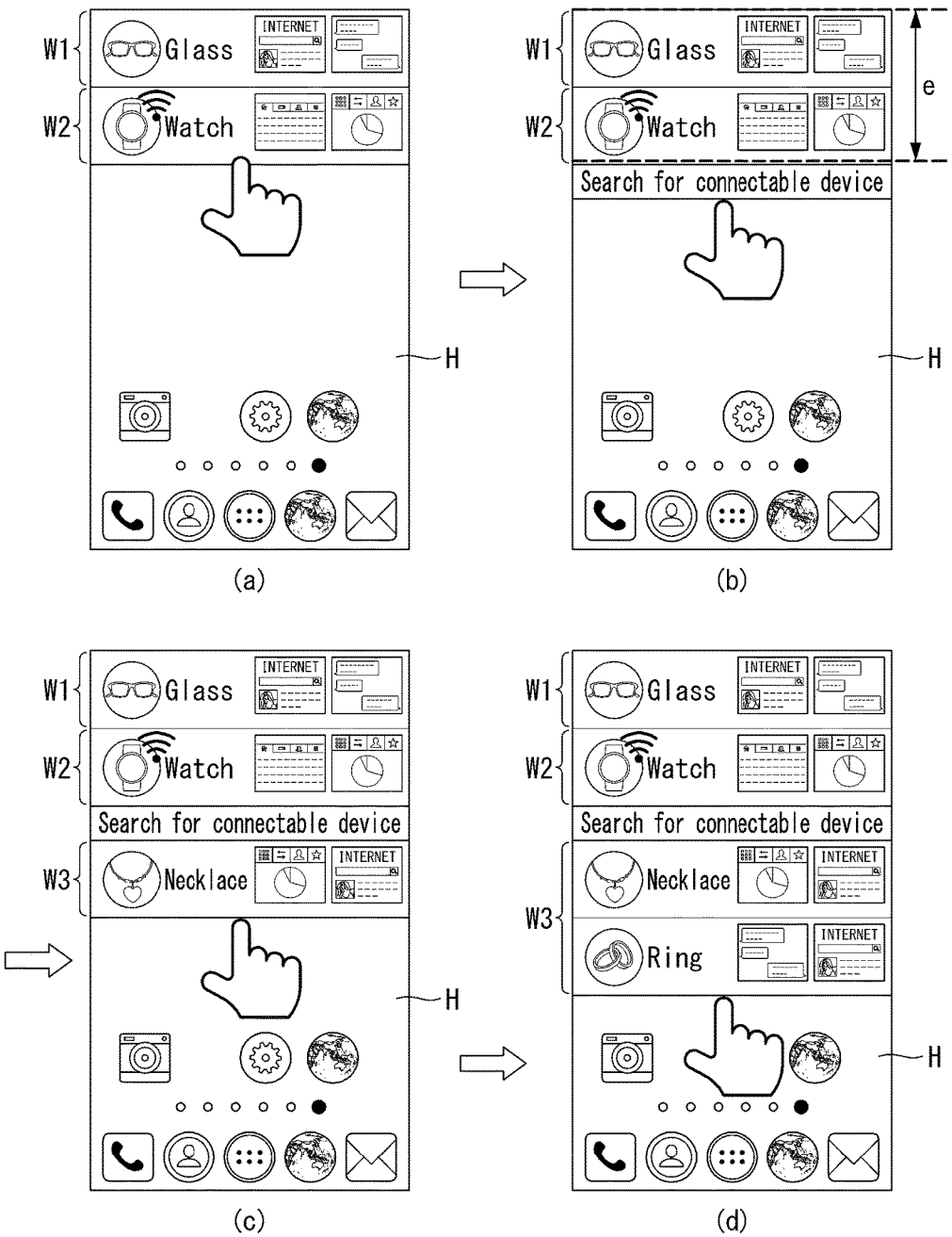

FIG. 17 illustrates a case of displaying a first window W1 that displays information of a currently connecting Bluetooth device, a second window W2 that displays information of a connectable device, and a third window W3 that displays information of a connectable device found through scan according to a user drag input distance.

Referring to FIG. 17A, when the controller 180 receives a user drag input in the indicator area 200 in which a Bluetooth icon BT is displayed, the controller 180 displays the first window W1 that displays information of a currently connecting Bluetooth device and the second window W2 that displays information of an unconnected Bluetooth device.

Referring to FIG. 17B, when the user drag input distance is equal to or larger than a predetermined distance e, the controller 180 may start search of a connectable device and display a "connectable device search" message.

Referring to FIG. 17C, the controller 180 may display a search result of connectable devices in the third window W3, and when a plurality of devices are found, the controller 180 may sequentially display the found devices in the third window W3, as shown in FIG. 17D. The controller 180 may align and display devices in recently connected order, recent use order, frequently use order, or found order in the third window W3. Further, found device information and information of an App available in a corresponding device may be together displayed.

Figure 18:
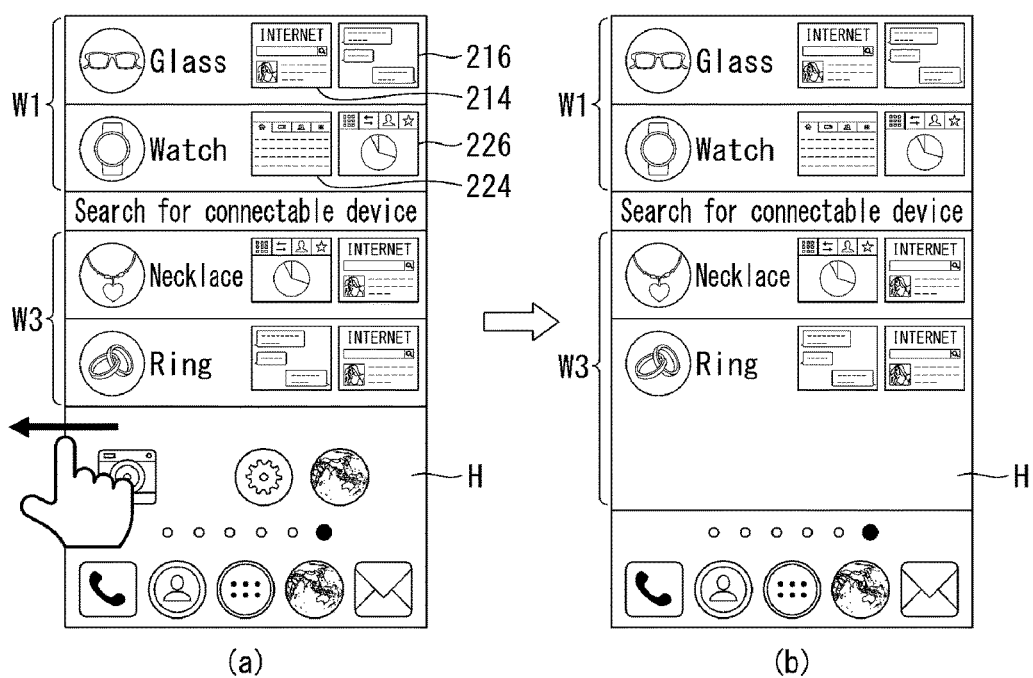
Figure 19:
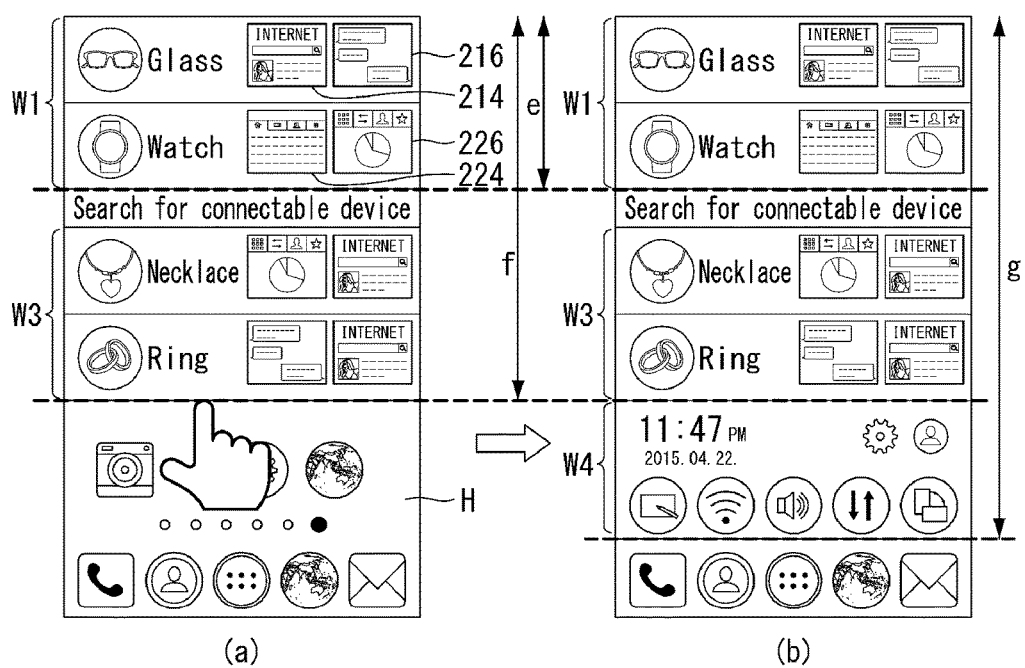
Figure 20:
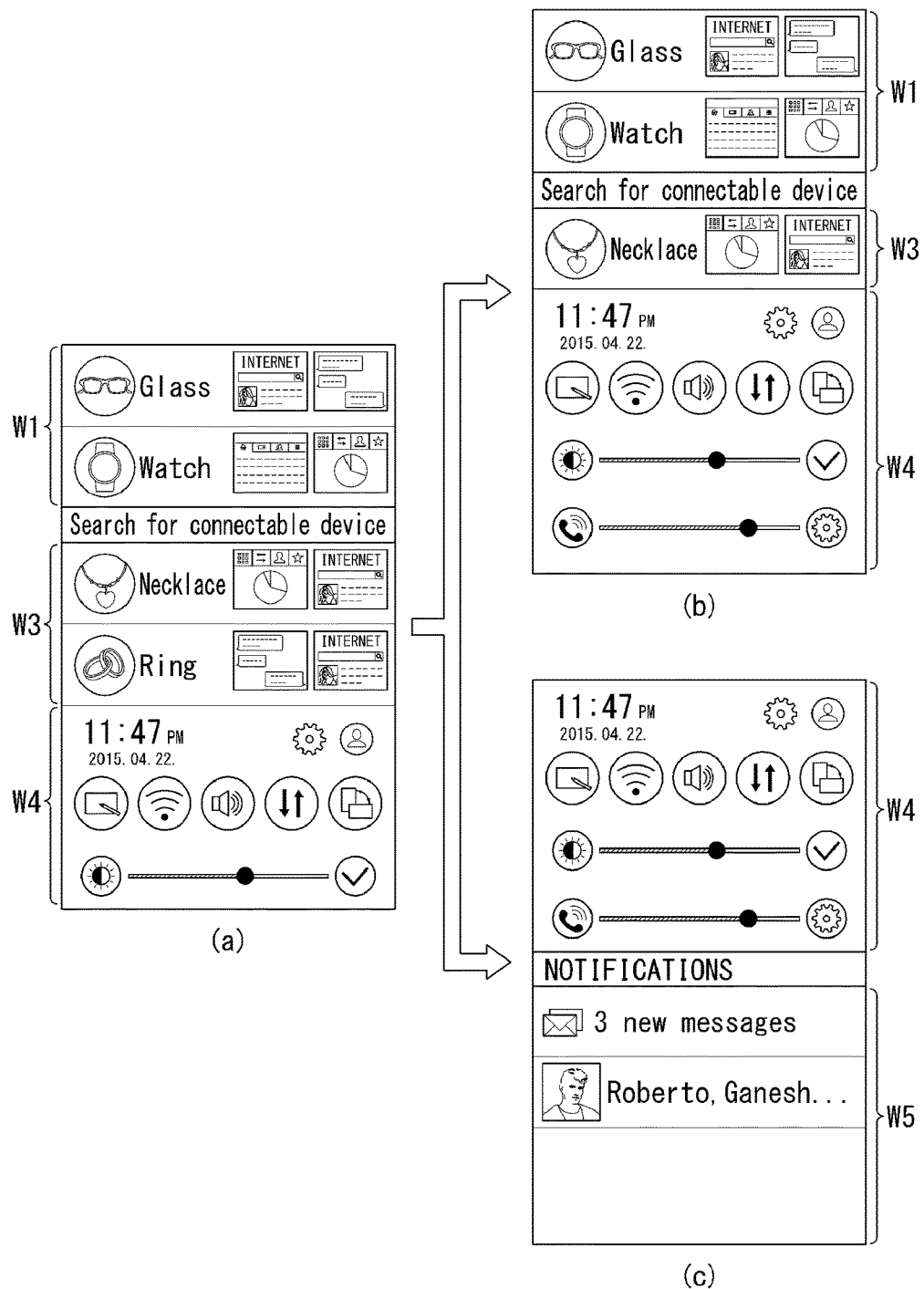
Figure 21:
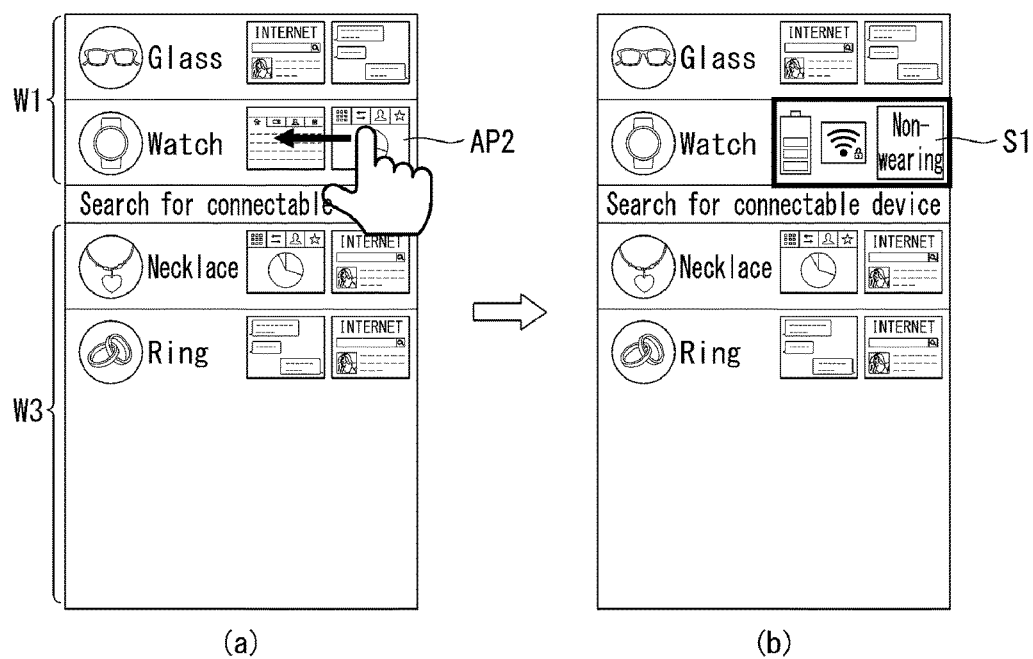
Figure 22:
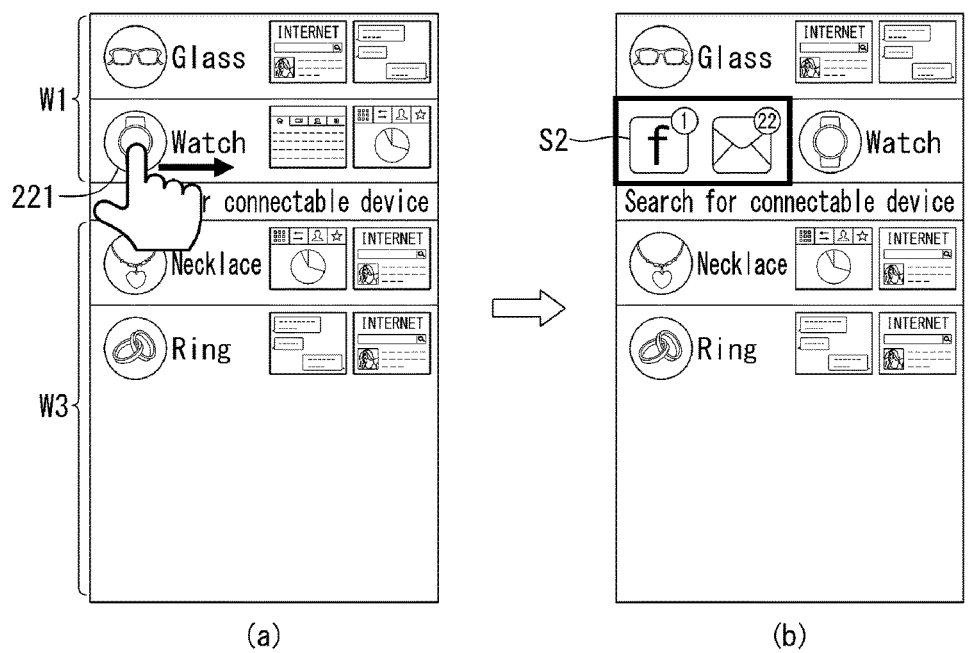

FIGS. 18 to 20 illustrate a method of controlling a display state of a Bluetooth window after displaying a search result of connectable devices in the third window W3.

Referring to FIG. 18A, the controller 180 may display a first window W1 that displays information of a currently connecting Bluetooth device and a third window W3 that displays information of connectable devices found through scan according to a user drag input distance on a home screen H. Here, a second window W2 that displays information of unconnected devices among devices in which a connection is previously set or previously used devices may be together displayed.

As shown in FIG. 18A, in a state in which the first window W1, the second window W2, and the third window W3 are displayed, when the user performs a drag input in a side bezel direction, the controller 180 may receive the user input and enlarge the third window W3 to display a Bluetooth window on an entire screen, as shown in FIG. 18B.

Referring to FIG. 19A, the controller 180 may display a first window W1 that displays information of a currently connecting Bluetooth device and a third window W3 that displays information of connectable devices found through scan according to a user drag input distance on the home screen H.

Here, when the user performs a drag input by a predetermined distance f or more, the controller 180 may receive the user input and display a fourth window W4, as shown in (b). In the fourth window W4, information provided when selecting an existing indicator area, for example, general notification information such as a time and message notification may be displayed.

FIG. 20 illustrates a method of controlling a display state of a Bluetooth window after a screen of FIG. 19B.

Referring to FIG. 20A, the controller 180 may display a first window W1 that displays information of a currently connecting Bluetooth device, a third window W3 that displays information of a connectable device found through scan, and a fourth window W4 provided when selecting an existing indicator area according to a user drag input distance on a home screen H.

After the first window W1, the third window W3, and the fourth window W4 provided when selecting an existing indicator area are displayed, when the user input is performed, the controller may enlarge a display area of the fourth window W4 and display information provided when selecting an existing indicator area, as shown in FIG. 20B.

Alternatively, the controller 180 may display a fifth window W5, as shown in FIG. 20C. The fifth window W5 may display the notification information provided when selecting an existing indicator area. For example, the fifth window W5 may display message receiving information, SNS notification information, and App notification information.

FIGS. 21 to 24 illustrate a process of displaying a Bluetooth window on an entire screen and controlling a function of a Bluetooth device using the Bluetooth window.

Referring to FIG. 21A, the controller 180 may display a first window W1 that displays information of a currently connecting Bluetooth device and a third window W3 that displays information of connectable devices found through scan on an entire screen according to a user drag input distance.

In the first window W1 that displays information of a currently connecting Bluetooth device, when the user selects AP2 of a specific device and performs a drag input, the controller 180 may execute the corresponding AP2 and display state information S1 of a corresponding device, as shown in FIG. 21B.

Here, the executed AP2 may include an App that manages state information S1 of the device. Accordingly, device state information S1 such as a battery of a smart watch managed by the AP2 selected by the user, wireless communication reception strength, whether the smart watch is worn, and a distance to a mobile terminal may be displayed.

Referring to FIG. 22A, in the first window W1 that displays information of a currently connecting Bluetooth device, the user may perform an input that touches and drags an icon 221 of a specific device.

When the user touches and drags an icon 221 of a specific device, the controller 180 may process a corresponding input and display update state information S2 of the corresponding device, as shown in FIG. 22B.

For example, when the selected device is a smart watch, update state information S2 of the device may include state information of an App executed in the smart watch. Accordingly, the update state information S2 of the device may include a message and an SNS notification received in the smart watch. Here, when selecting a message icon and an SNS notification icon displayed in the update state information S2 of the device, the user can enter the corresponding App and determine a notification content.

Figure 23:
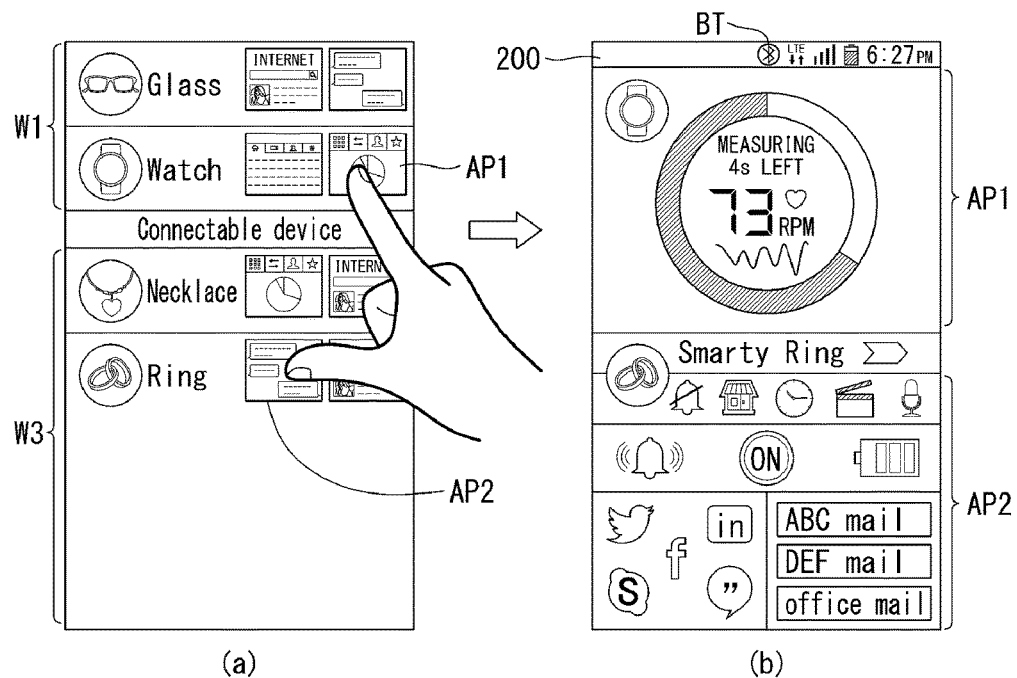

Referring to FIG. 23, by processing a user multi touch input, the controller 180 may simultaneously execute Apps of a multiple device. FIG. 23 illustrates a case in which the user selects a plurality of Apps.

Referring to FIG. 23A, the controller 180 may receive a user touch input that is simultaneously input to the first window W1 that displays information of a currently connecting Bluetooth device and the third window W3 that displays information of a connectable device found through scan. For example, the user may simultaneously touch a first AP1 related to a smart watch of the first window W1 and a second AP2 related to a smart ring displayed in the third window W3.

Referring to FIG. 23B, the controller 180 may divide a touch screen 150, execute the first AP1 related to the smart watch in one area, and display an execution screen thereof and execute the second AP2 related to a smart ring and display an execution screen thereof in another area. Here, when the smart ring displayed in the third window W3 is in an unconnected state, the controller 180 may first connect short distance wireless communication with the smart ring and execute and display the second AP2.

Figure 24:
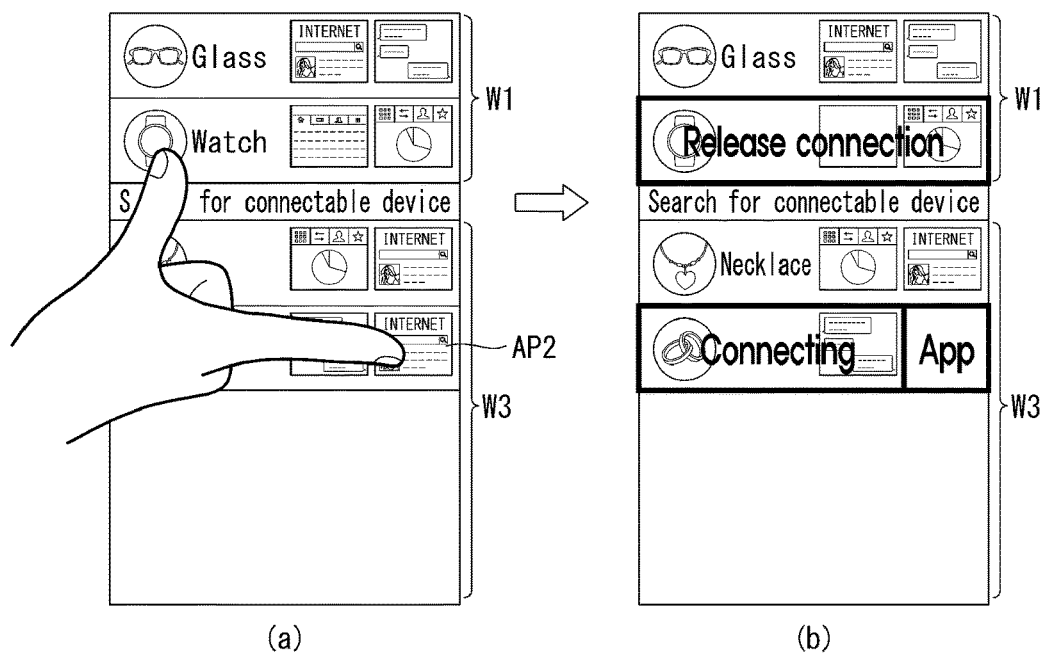
Figure 24:
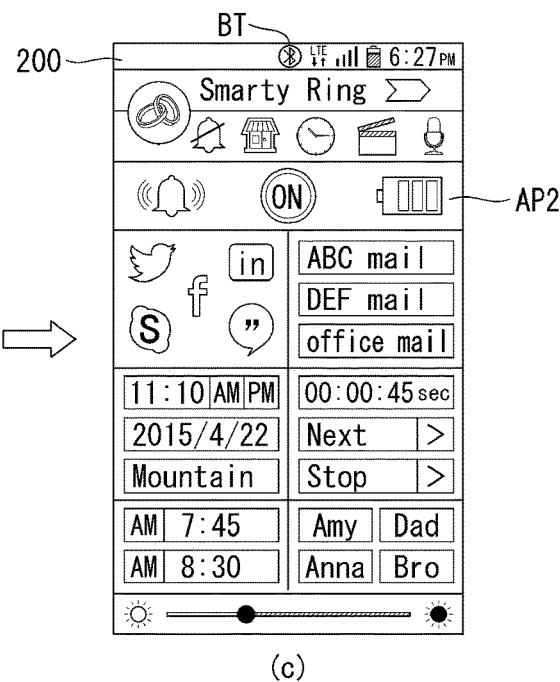

Referring to FIG. 24, the controller 180 may process a user multi touch input and simultaneously execute a connection/release operation of the device and an execution/termination operation of an App.

Referring to FIG. 24A, the controller 180 may receive a user touch input that is simultaneously input to a first window W1 that displays information of a currently connecting Bluetooth device and a third window W3 that displays information of connectable devices found through scan. For example, the user may simultaneously touch the smart watch icon 221 of the first window W1 and the second AP2 related to a smart ring displayed in the third window W3.

Referring to FIG. 24B, the controller 180 may process a touch input to the smart watch icon 221 of the first window W1 to release a connection to the smart watch. The controller 180 may process a touch input to the second AP2 related to the smart ring displayed in the third window W3 to execute the second AP2 related to the smart ring. Here, when the smart ring displayed in the third window W3 is in an unconnected state, the controller 180 may first connect short distance wireless communication with the smart ring and execute the second AP2.

When the second AP2 is executed, the controller 180 may display an execution screen in the display, as shown in FIG. 24C.

Figure 25:
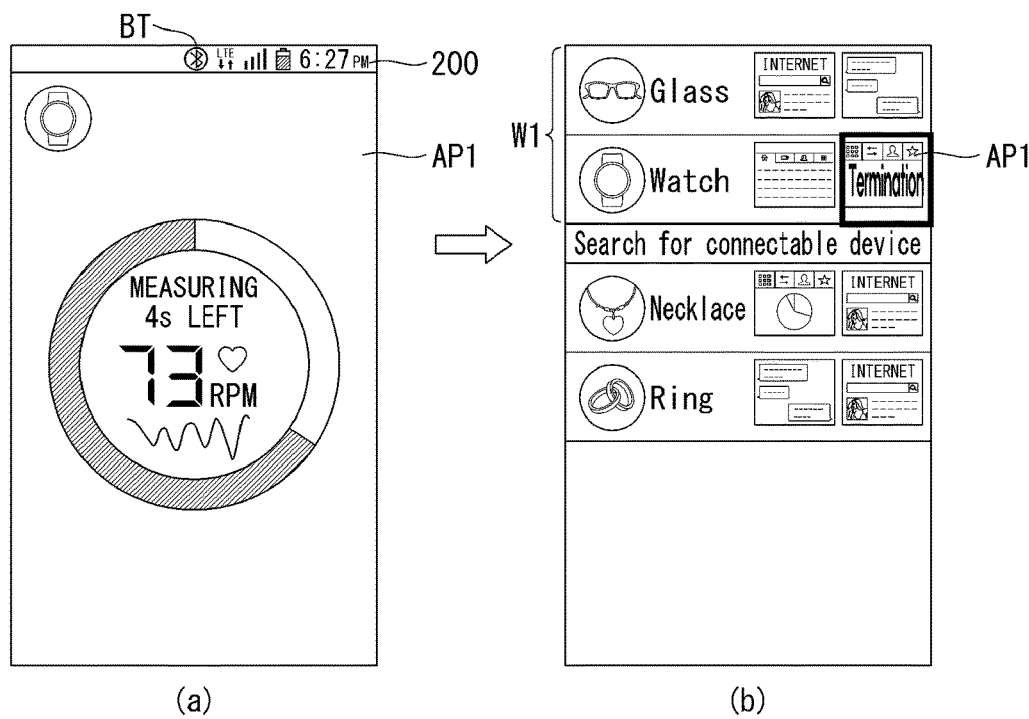
Figure 25:
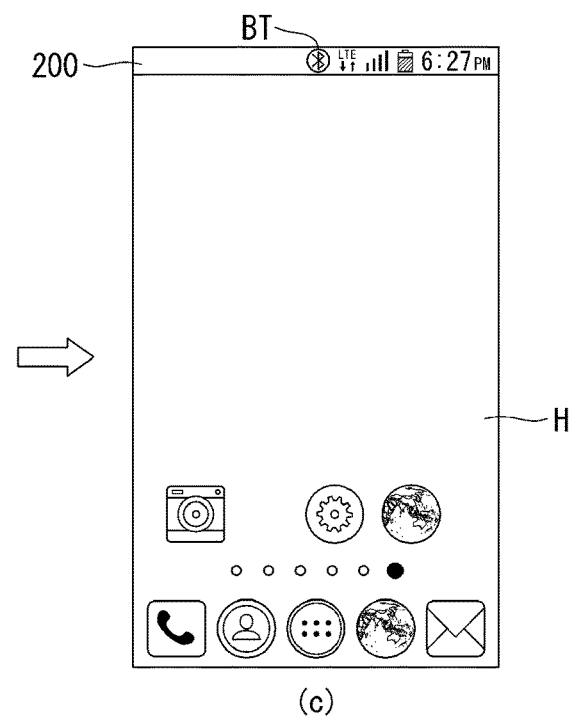
Figure 26:
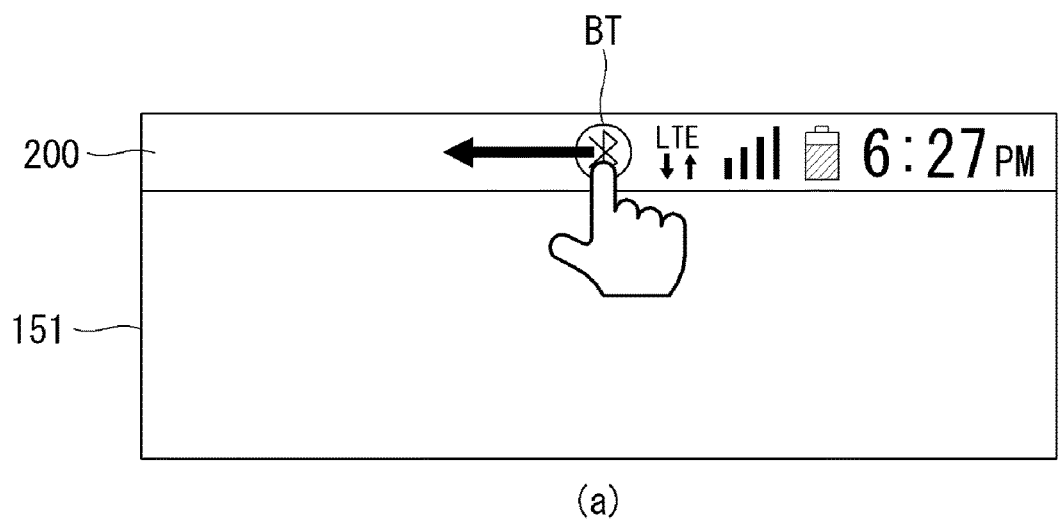
FIGS. 26 to 30 are diagrams illustrating a method of controlling a short range communication function according to a second exemplary embodiment of the present invention.
Figure 26:
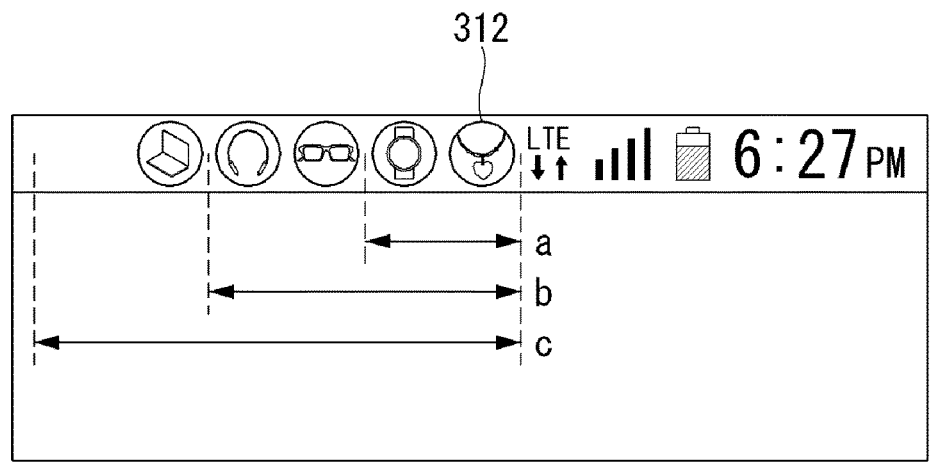

FIG. 25 illustrates a screen control process when entering an execution screen of an AP1 of a specific Bluetooth device and terminating the corresponding AP1 through a Bluetooth window such as the first window W1 or the third window W.

Referring to FIG. 25A, when executing an AP1 of a specific Bluetooth device through the Bluetooth window, a corresponding execution screen may be displayed on an entire screen. Here, when the user terminates a currently executing AP1, as shown in FIG. 25B, the first window W1 may be again displayed. In the first window W1, a termination state of a currently terminating AP1 may be displayed. Here, the user may again touch and re-execute the terminating AP1 or may select and execute another App.

When the user input is not received, the controller 180 may terminate a Bluetooth window and display a home screen H.

FIGS. 26 to 30 are diagrams illustrating a method of controlling a short range communication function according to a second exemplary embodiment of the present invention.

Referring to FIG. 26A, the touch screen 151 of the mobile terminal includes an indicator area 200 that displays a battery residual quantity, whether a network is connected, a time, and a notification message, and when a Bluetooth function is in an activation state, a Bluetooth icon BT is displayed in the indicator area 200. When the user touches the Bluetooth icon BT and drags the Bluetooth icon BT in a length direction of the indicator area 200, an icon 312 of the Bluetooth device may be displayed, as shown in FIG. 26B. The controller 180 may display icons of different Bluetooth devices according to a user drag length. Here, even when the user drags a random indicator area 200 instead of the Bluetooth icon BT in a length direction, the controller 180 may control to display the icon 312 of the Bluetooth device For example, when a drag input of a first reference distance a is received, the controller 180 may display an icon of a device in a currently connecting state, and when a drag input of a second reference distance b is received, the controller 180 may display an icon of a preset Bluetooth device or a frequent use Bluetooth device, and when a drag input of a third reference distance c is received, the controller 180 may display an icon 312 of a device found through scan.

Figure 27:
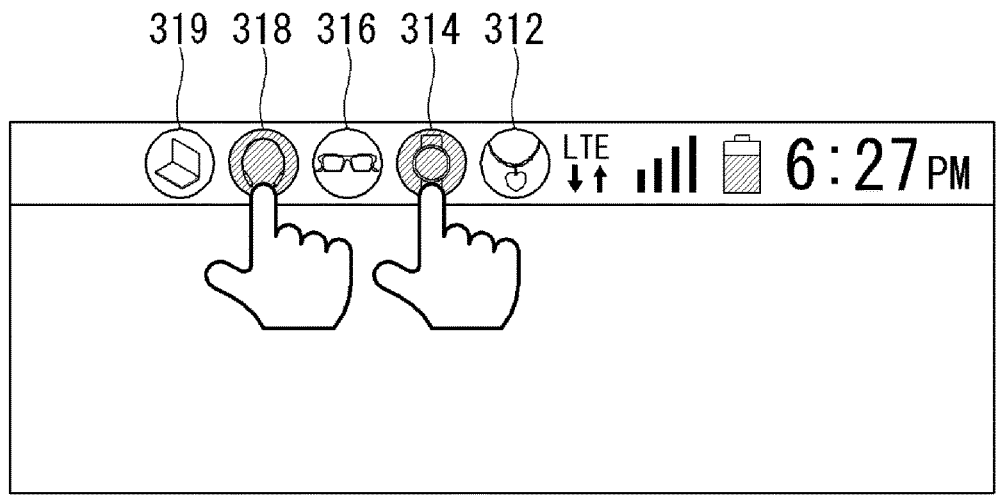

Thereafter, as shown in FIG. 27, icons 312, 314, 316, 318, and 319 of the device displayed in the indicator area 200 may be displayed to distinguish according to a connected/unconnected state. For example, an icon in an unconnected state may be displayed with dark colors 314 and 318, and a mark "x" notifying an unconnected state may be additionally displayed. Accordingly, the user may determine whether each device is connected with only determination of icons of the device displayed in the indicator area 200.

When a predetermined user input to icons 312, 314, 316, 318, and 319 of the device displayed in the indicator area 200 is received, the controller 180 may perform a Bluetooth connection to the selected device or may release a connected device.

For example, when the icons 314 and 318 in an unconnected state are touched, the controller 180 may perform a Bluetooth connection to a corresponding device. When the icons 312, 316, and 318 in a connected state are touched, the controller 180 may release a Bluetooth connection to a corresponding device.

Figure 28:
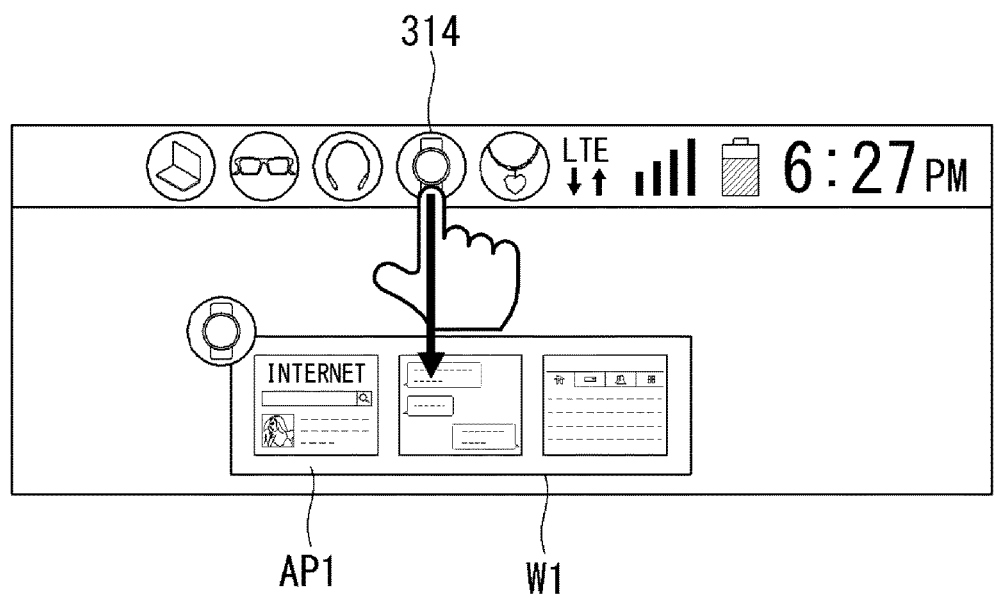

Referring to FIG. 28, when an input that drags downward an icon 314 of a device displayed in the indicator area 200 is received, the controller 180 may display the first window W1 that displays information related to a corresponding Bluetooth device. In the first window W1, information of an AP available by interworking with a corresponding Bluetooth device may be displayed. An AP available by interworking with a corresponding device may be displayed in a form of a name, an icon, or an execution screen thereof. Further, when displaying a plurality of Apps, the plurality of Apps may be displayed in recent use order, recently connected order, or frequently use order.

Figure 29:
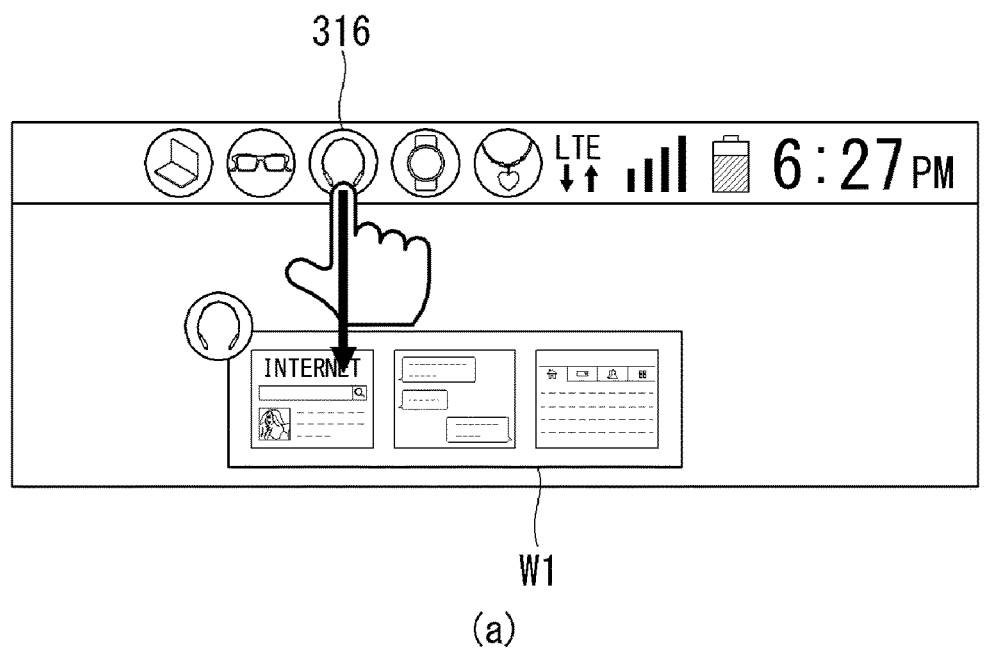
Figure 29:
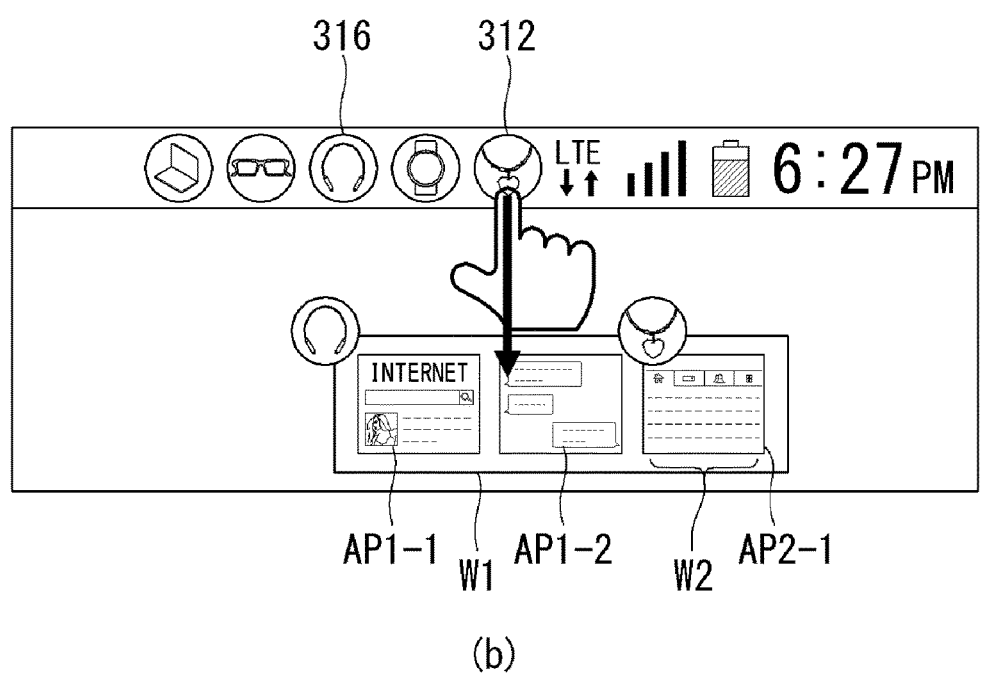
Figure 30:
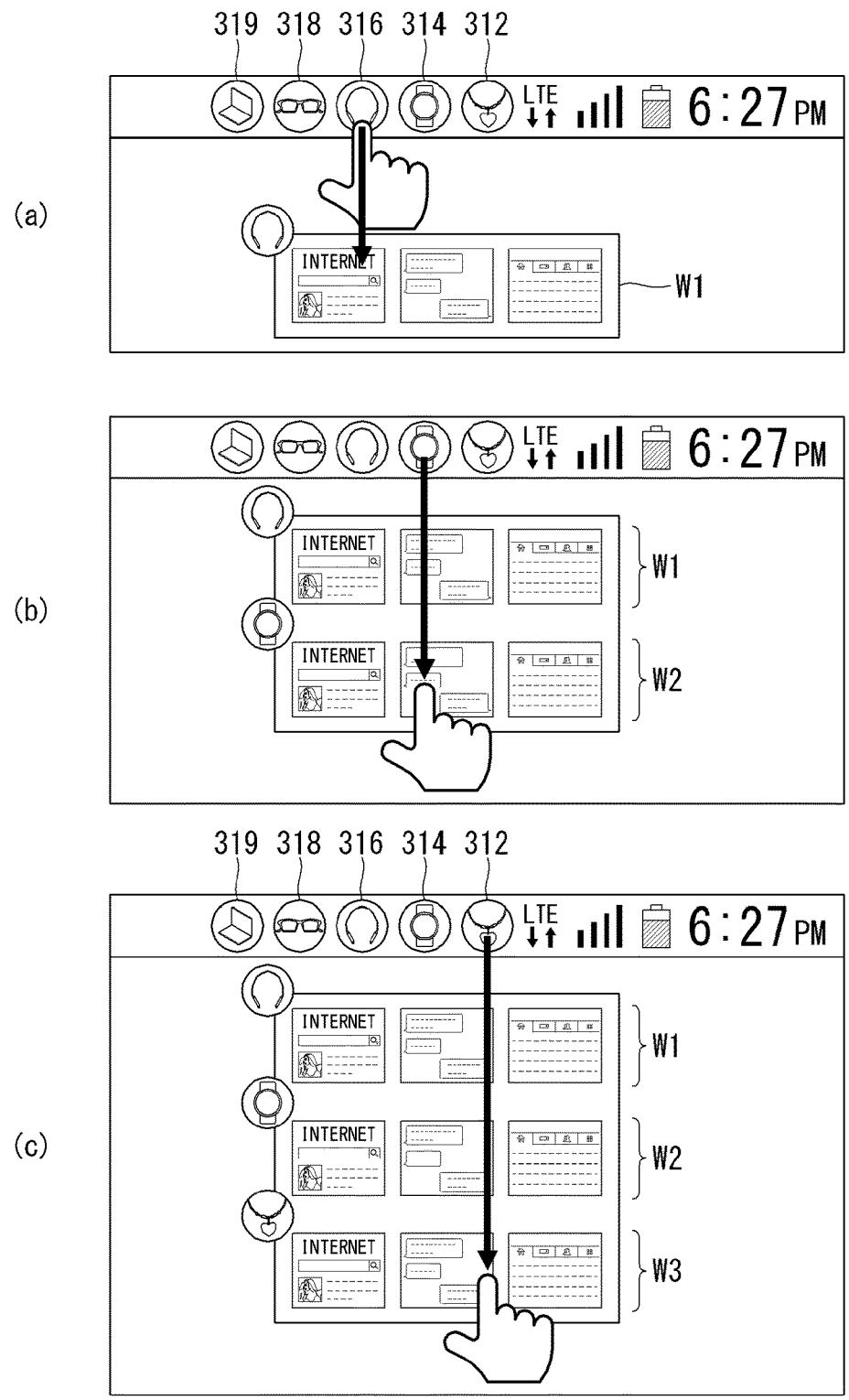
Figure 31:
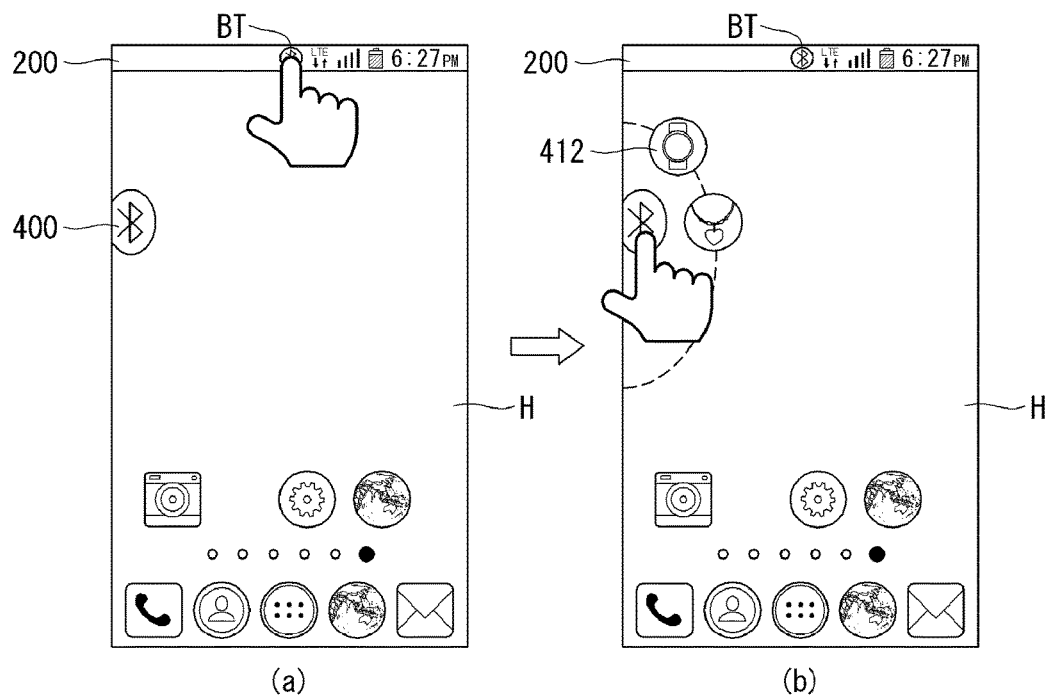
FIGS. 31 to 38 are diagrams illustrating a method of controlling a short range communication function according to a third exemplary embodiment of the present invention.
Figure 32:
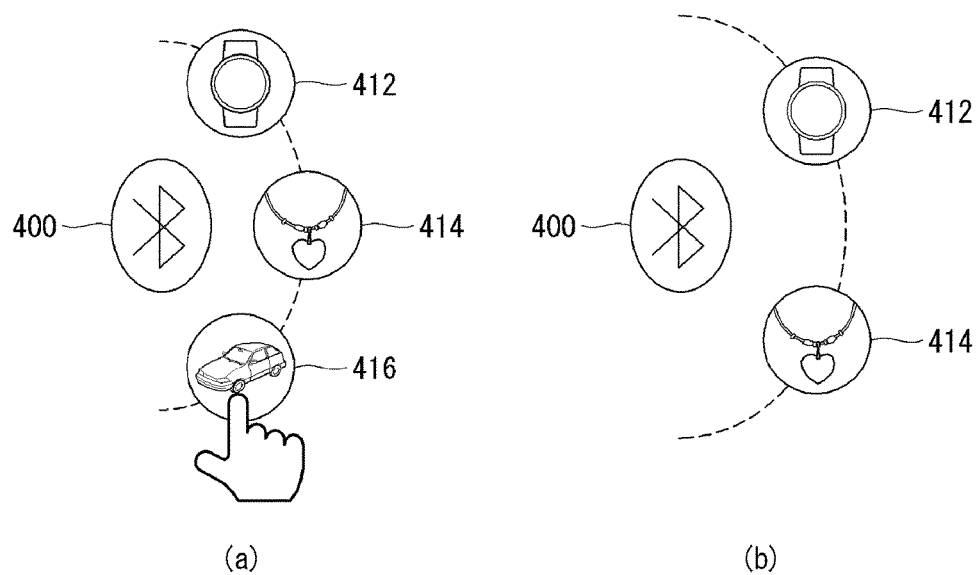
Figure 33:
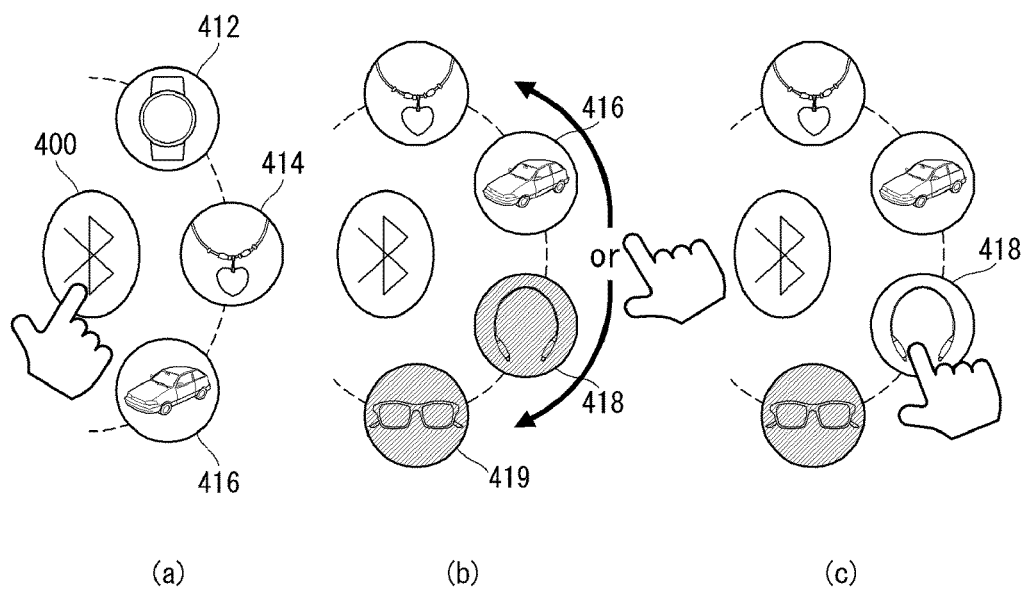

Referring to FIGS. 29 and 30, when the icons 312 and 316 of a plurality of devices are selected, the controller 180 may display a plurality of windows W1 and W2 to correspond to the selected icons 312 and 316, respectively.

Referring to FIG. 29, after the first window W1 of the first device icon 316 is displayed, when the icon 312 of the second device is selected, the second window W2 following the first window W1 may be displayed. Here, the first window W1 and the second window W2 may be enlarged and displayed in a horizontal direction.

Referring to FIG. 30, when the first device icon 316, the second device icon 314, and the third device icon 312 are sequentially selected, the controller 180 may arrange and display the first window W1, the second window W2, and the third window W3 corresponding to each icon in a length direction.

That is, after the first window W1 of the first device icon 316 is displayed, when the icon 314 of the second device is selected, the second window W2 following the first window W1 is display. Thereafter, when the third device icon 312 is selected, the third window W3 following the second window W2 may be displayed.

Here, the controller 180 may display information of an AP available by interworking with a corresponding Bluetooth device in each of the windows W1, W2, and W3. The controller 180 may display an AP available by interworking with a corresponding device in a form of a name, an icon, or an execution screen thereof. Further, when a plurality of Apps are displayed, the plurality of Apps may be displayed in recent use order, recently connected order, or frequently use order.

FIGS. 31 to 38 are diagrams illustrating a method of controlling a short range communication function according to a third exemplary embodiment of the present invention.

The touch screen 151 of the mobile terminal 100 includes an indicator area that displays a state of the terminal. The indicator area is an area that displays a battery residual quantity, whether a network is connected, a time, and a notification message and may be distinguished from a screen display area in which an icon is displayed and in which a page is converted. When a Bluetooth function is in an activated state, a Bluetooth icon BT is displayed in the indicator area 200.

Referring to FIG. 31A, when the Bluetooth icon BT of the indicator area 200 is selected, the controller 180 may display a Bluetooth icon 400 in other area, except for the indicator area 200, for example, on a home screen H.

Referring to FIG. 31B, when the Bluetooth icon 400 displayed on the home screen H is selected, the controller 180 may display an icon 412 of a currently connecting Bluetooth device.

Referring to FIG. 32A, the user may touch and select icons 412, 414, and 416 of a currently connecting Bluetooth device displayed on the home screen H. When the user touches the icon 416 of a specific Bluetooth device, the controller 180 may release a connection to a corresponding device.

Thereafter, as shown in FIG. 32B, the controller 180 may display the icons 412 and 414 of a currently connecting Bluetooth device, except for the icon 416 of a device selected by the user.

Referring to FIG. 33A, when the Bluetooth icon 400 displayed on the home screen H is selected, the controller 180 may display the icon 416 of a Bluetooth device of currently connecting devices 412, 414, and 416.

Referring to FIG. 33B, when a scroll input to the icons 412, 414, and 416 of a Bluetooth device displayed on a screen is received, the controller 180 may display icons 418 and 419 of unconnected Bluetooth devices. By displaying the icons 418 and 419 of a connecting Bluetooth device 416 and an unconnected Bluetooth device with different light and shade or by additionally displaying a connection release notification or a mark "X", the user may recognize whether Bluetooth is connected through a display state of an icon. When unconnected Bluetooth devices are the plural, the controller 180 may display the icons 418 and 419 in recent use order, recently connected order, or frequently use order. The controller 180 may display the icon 418 of more Bluetooth devices with a method of scrolling a display area in a specific direction according to a user scroll length. Referring to FIG. 33C, when the user touches the icon 418 of a Bluetooth device displayed as an unconnected device among icons of Bluetooth devices displayed on a screen, the controller 180 may perform a connection to a corresponding device. When the user touches the icons 412 and 414 of Bluetooth devices displayed in a connected state, the controller 180 may release a connection to the corresponding device.

Figure 34:
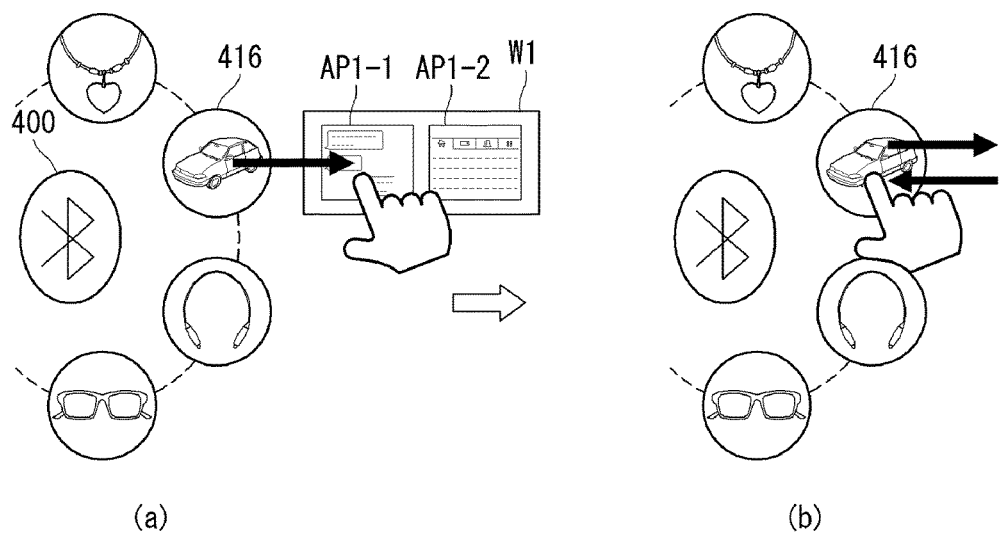

Referring to FIG. 34, as shown in FIG. 34A, when the user drags the icon 416 of a specific Bluetooth device among icons of Bluetooth devices displayed on a screen in an outside direction, the controller 180 may display a first window W1 that displays information related to the corresponding Bluetooth device.

In the first window W1, information of an AP available by interworking with a corresponding Bluetooth device may be displayed. The AP available by interworking with a corresponding device may be displayed in a form of a name, an icon, or an execution screen thereof. Further, when displaying a plurality of AP1 and AP2, the plurality of AP1 and AP2 may be displayed in recent use order, recently connected order, or frequently use order.

As shown in FIG. 34B, when the user drags an icon 416 of a specific Bluetooth device among icons of Bluetooth devices displayed on a screen in the outside direction and drags again the icon 416 in a backward direction, the controller 180 may hide the first window W1 that displays information related to a corresponding Bluetooth device.

Figure 35:
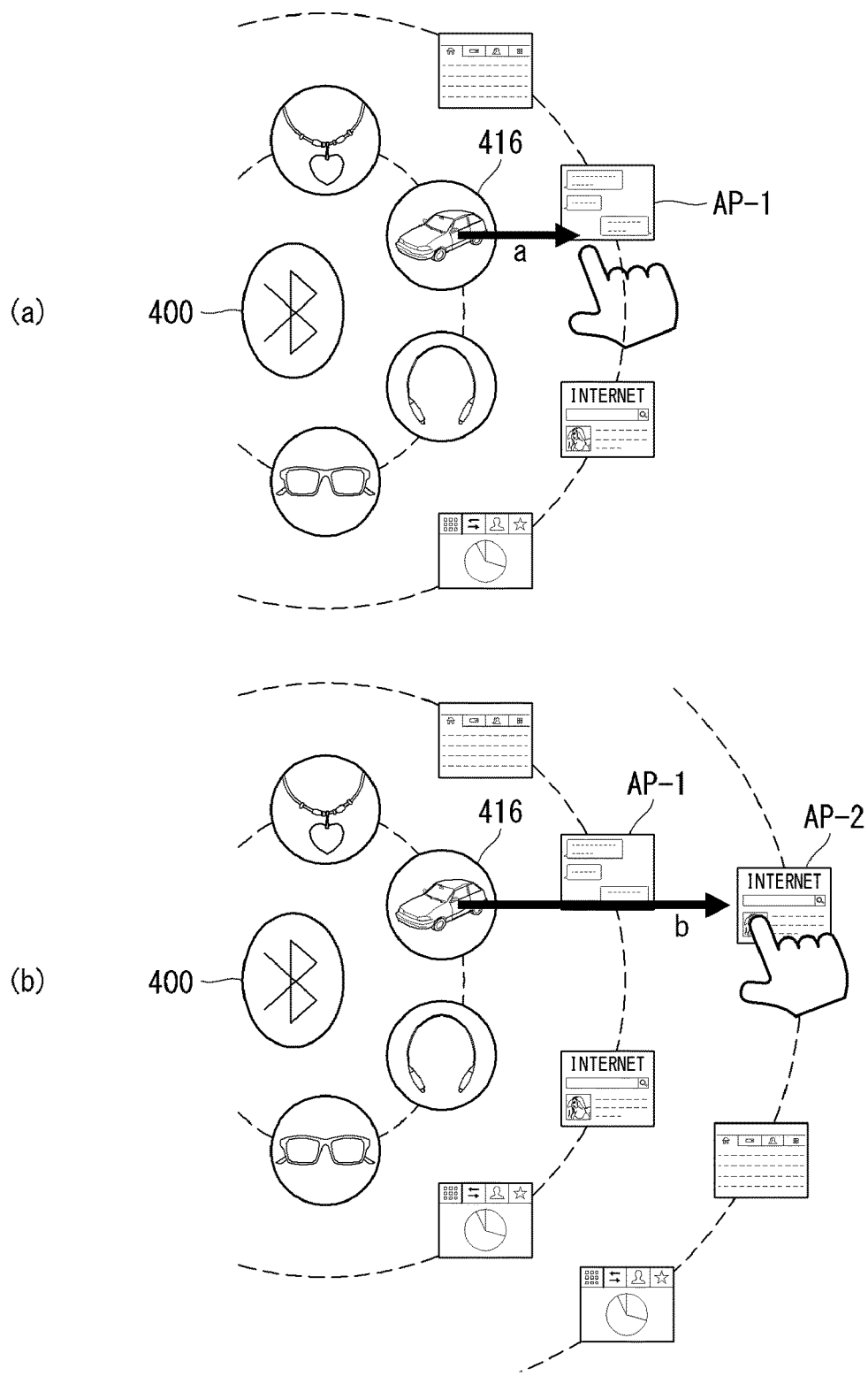

Referring to FIG. 35, when the Bluetooth icon 400 is selected, the controller 180 displays an icon 416 of the Bluetooth device, and when a drag input of a first reference distance a is received, the controller 180 may display a first AP1 related to each Bluetooth device, and when a drag input of a second reference distance b is received, the controller 180 may display a second AP2 related to each Bluetooth device.

Referring to FIG. 35B, an icon 416 of a plurality of Bluetooth devices displayed according to a user selection and a drag input and a first AP1 and a second AP may be arranged on a concentric circle about the Bluetooth icon 400.

That is, the controller 180 may arrange the entire icons 416 of a plurality of Bluetooth devices about the Bluetooth icon 400 at the same distance, arrange a plurality of first AP1 at the same distance at a distance relatively further than the icon 416 of the Bluetooth device, and arrange a plurality of second AP2 at the same distance at a distance relatively further than the AP1.

Figure 36:
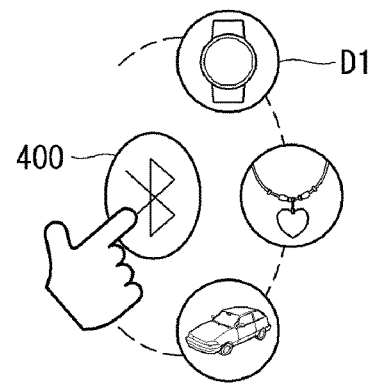
Figure 36:
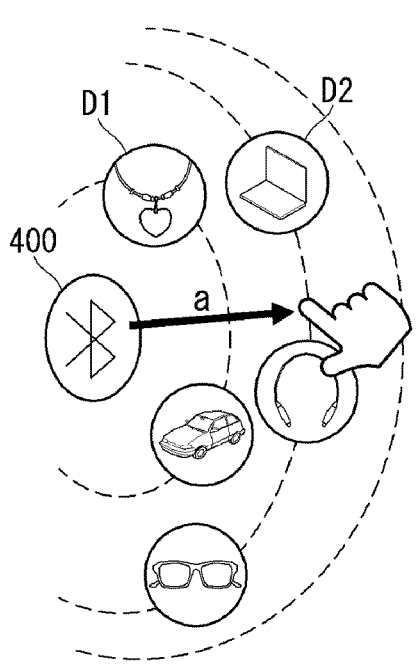
Figure 36:
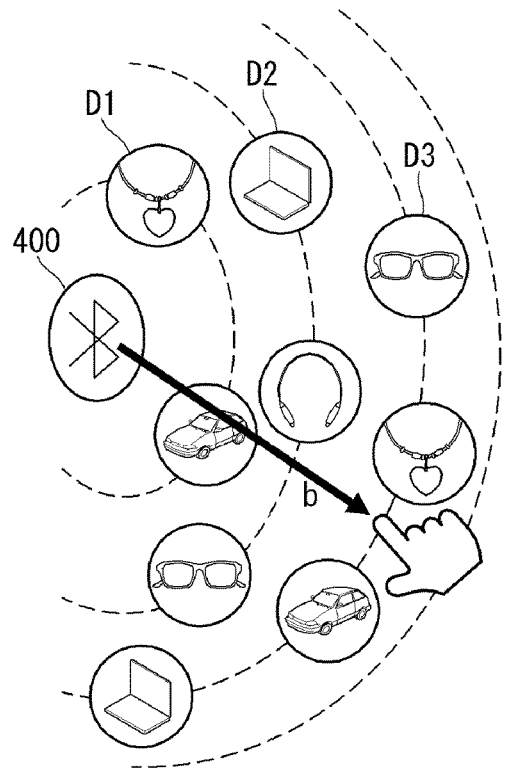

FIG. 36 illustrates a case of displaying icons of a currently connecting device D1, a recently connected device or a device D2 to which a connection is set by a user, and a device D3 found through scan in a concentric circle form according to a distance of a user drag input.

Referring to FIG. 36A, when receiving an input of selection to the Bluetooth icon 400, the controller 180 may display the currently connecting device D1.

Referring to FIG. 36B, in a state in which the currently connecting device D1 is displayed, when a drag input of a first reference distance a is received, the controller 180 may display a recently connected device or a device D2 to which a connection is set by a user.

Referring to FIG. 36C, in a state in which the currently connecting device D1 and the recently connected device or the device D2 to which a connection is set by a user are displayed, when a drag input of a second reference distance b is received, the controller 180 may display an icon D3 of a device found through scan.

Figure 37:
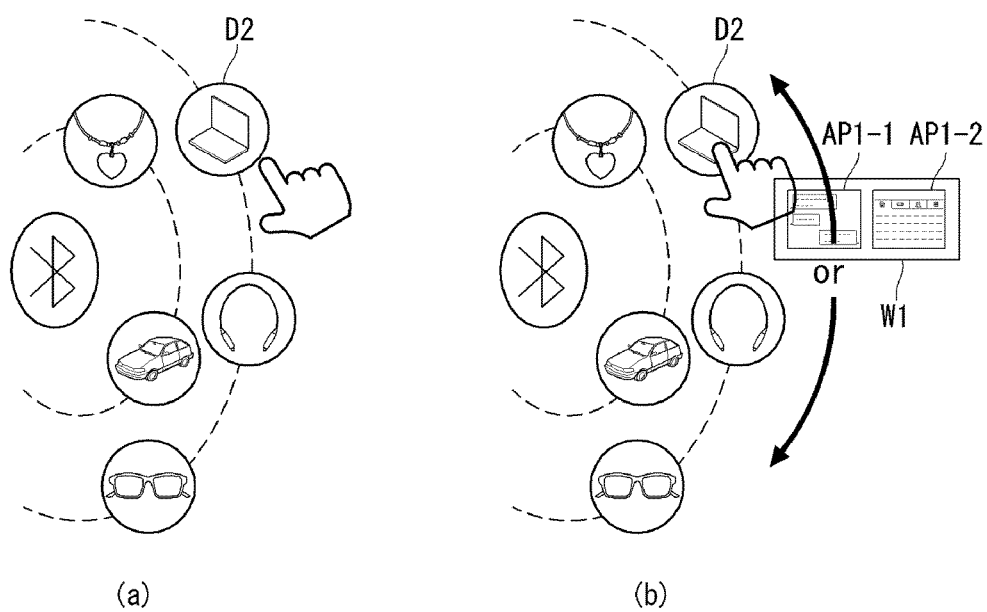

FIG. 37 illustrates a case of displaying a window W1 related to a device selected by a user according to a distance of a user drag input.

As shown in FIG. 37A, when the user drags upward or downward an icon D2 of a random Bluetooth device among icons of Bluetooth devices displayed on a screen, the controller 180 may display a first window W1 that displays information related to a corresponding Bluetooth device, as shown in FIG. 37B.

In the first window W1, information of an AP available by interworking with a corresponding Bluetooth device may be displayed. An AP available by interworking with a corresponding device may be displayed in a form of a name, an icon, or an execution screen thereof. Further, when displaying a plurality of AP1 and AP2, the plurality of AP1 and AP2 may be displayed in recent use order, recently connected order, or frequently use order.

Figure 38:
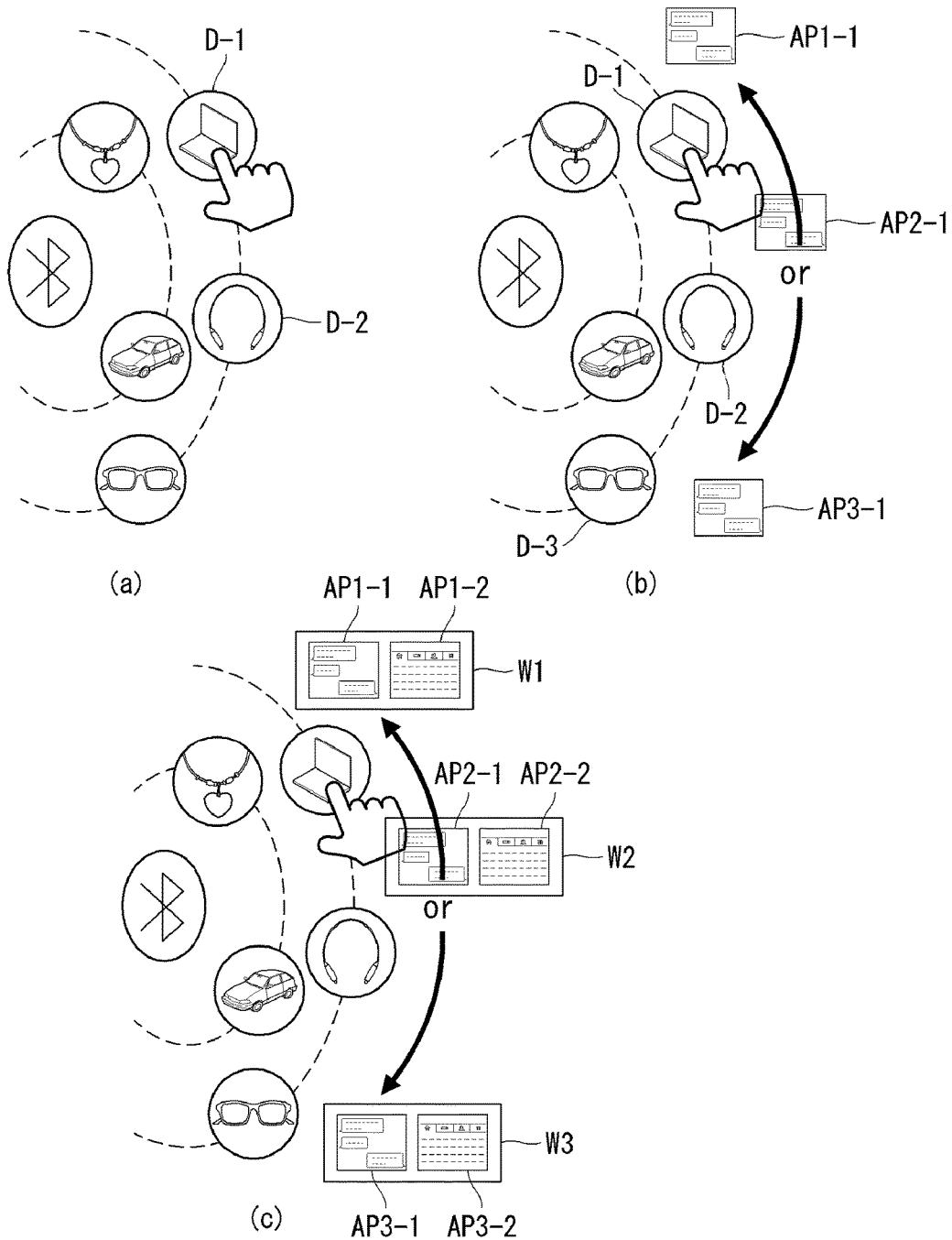

FIG. 38 illustrates a case of displaying a plurality of windows W1, W2, and W3 related to a plurality of Bluetooth devices according to a distance of a user drag input.

Referring to FIG. 38A, the controller 180 may display icons such as a currently connecting device D1 and a recently connected device or a device D2 to which a connection is set by a user in a concentric circle form according to each characteristic according to a distance of a user drag input.

Referring to FIG. 38B, when the user drags a proximity area of icons D1 and D2 of the Bluetooth device in an outside direction or when the user scrolls icons D1 and D2 of the Bluetooth device, the controller 180 may display information of AP1, AP2, and AP3 related to a corresponding device through a plurality of windows W1, W2, and W3 that display information related to a corresponding Bluetooth device.

Referring to FIG. 38C, when displaying a plurality of AP1 and AP2 related to each device, the controller 180 may display the plurality of AP1 and AP2 in recent use order, recently connected order, or frequently use order.

FIGS. 39 to 45 are diagrams illustrating a method of controlling a short range communication function according to a fourth exemplary embodiment of the present invention.

The touch screen 151 of the mobile terminal includes an indicator area 200 that displays a battery residual quantity, whether a network is connected, a time, and a notification message, and when a Bluetooth function is in an activated state, a Bluetooth icon 300 is displayed in the indicator area 200.

Figure 39:
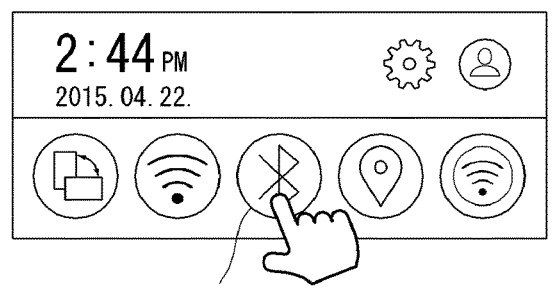
FIGS. 39 to 45 are diagrams illustrating a method of controlling a short range communication function according to a fourth exemplary embodiment of the present invention.
Figure 39:
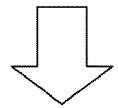
Figure 39:
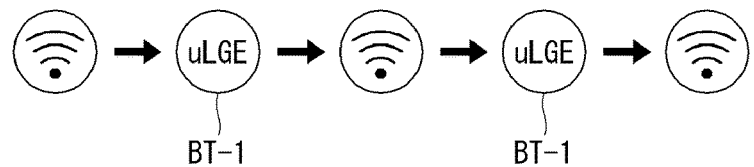
Figure 39:
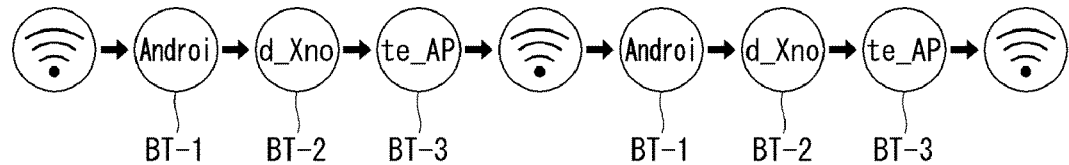
Figure 40:
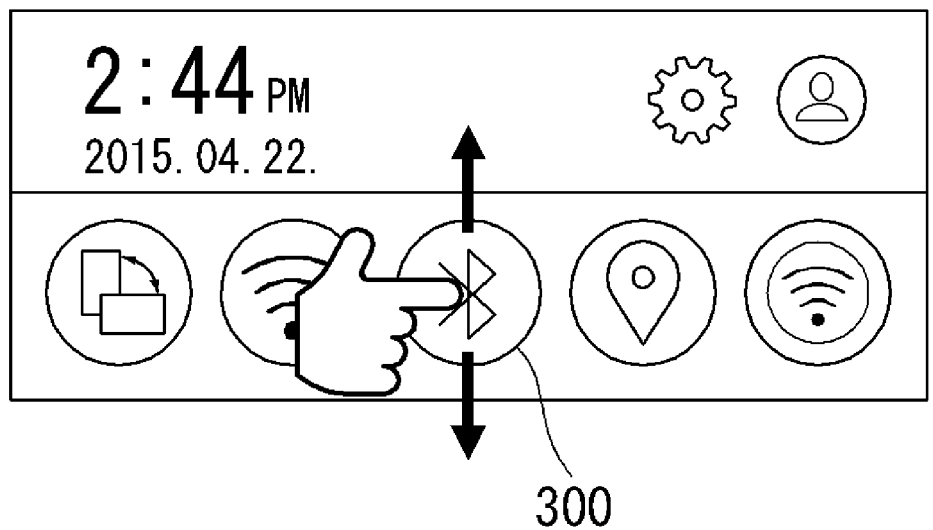

FIGS. 39 and 40 are diagrams illustrating an exemplary embodiment that displays a name of a connection device in the Bluetooth icon 300 to easily determine a device currently connected by Bluetooth.

Referring to FIG. 39, the Bluetooth icon 300 may be displayed together with another state display icon, for example, a screen rotation icon, a Wi-Fi icon, and a position information display icon.

Here, when the Bluetooth icon 300 is selected, a Bluetooth equipment name is displayed instead of an original Bluetooth mark. When a touch input to the Bluetooth icon 300 is received, the controller 180 may display a Bluetooth equipment name instead of a Bluetooth mark displayed in the Bluetooth icon 300.

Referring to FIG. 39A, when a Bluetooth equipment name has a length that may be displayed within the Bluetooth icon 300 and is, for example, a short name of "uLGE", the controller 180 may switch and display an icon (Wi-Fi icon) right next to the short name and a Bluetooth icon.

Referring to FIG. 39B, when the Bluetooth equipment name is longer than a length that may be displayed within the Bluetooth icon 300 and is, for example, a long text name of "Android_Xnote_AP", the controller 180 may display an equipment name with a method of separating and scrolling a text into "Androi", "d_Xno", and "te_AP" and finally display a Bluetooth icon.

Referring to FIG. 40, by performing an input with a method of displaying the Bluetooth icon 300 at a normal time and dragging the Bluetooth icon 300 upward/downward after the Bluetooth equipment is connected, the controller 180 may determine a name of connected equipment. Accordingly, when an input that drags the Bluetooth icon 300 upward/downward is received, the controller 180 may display a name of a currently connected equipment.

FIGS. 41 to 45 illustrate a process of controlling a Bluetooth related function using a Bluetooth icon BT displayed in the indicator area 200.

Figure 41:
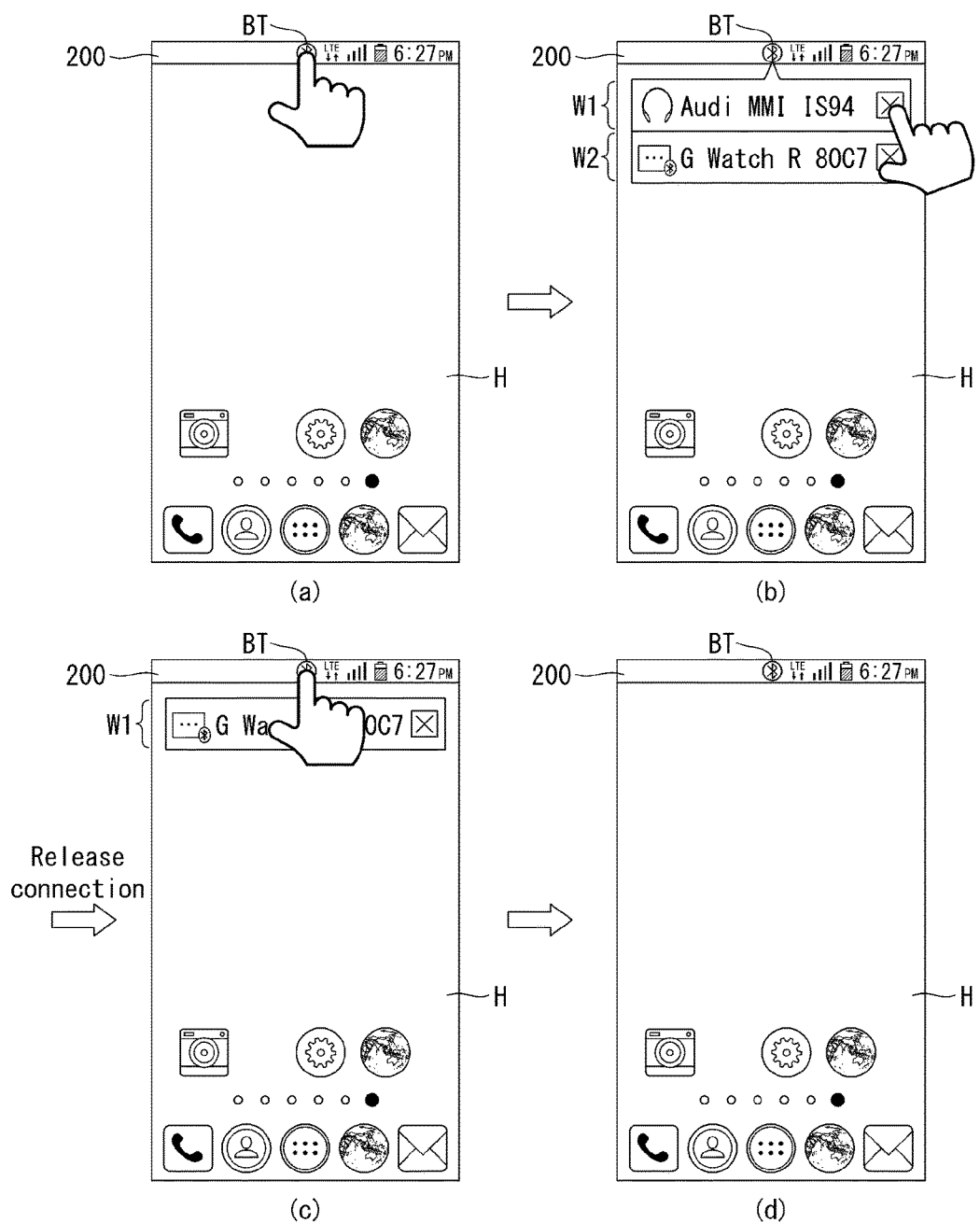

Referring to FIG. 41, as shown in FIG. 41A, when a Bluetooth function is in an activated state, the controller 180 displays a Bluetooth icon BT in the indicator area 200. Accordingly, when the user touches a Bluetooth icon BT displayed in the indicator area 200 or the indicator area 200, the controller 180 may display a window W1 that displays a Bluetooth connection equipment, as shown in FIG. 41B.

In the window W1, information of a device in a currently connecting state and information of a preset Bluetooth device or a frequent use Bluetooth device may be displayed. Information of a Bluetooth device displayed in the window W1 may include an icon of a corresponding device and a device name, and a connection release button x to the corresponding device may be together displayed. When the user selects a connection release button x, the controller 180 releases a connection to a corresponding equipment. Accordingly, as shown in a screen of FIG. 41C, information of a corresponding equipment is disappeared in the window W1.

Thereafter, when a separate input is not received, the controller 180 may display a home screen H, as shown on a screen of FIG. 41D.

Figure 42:
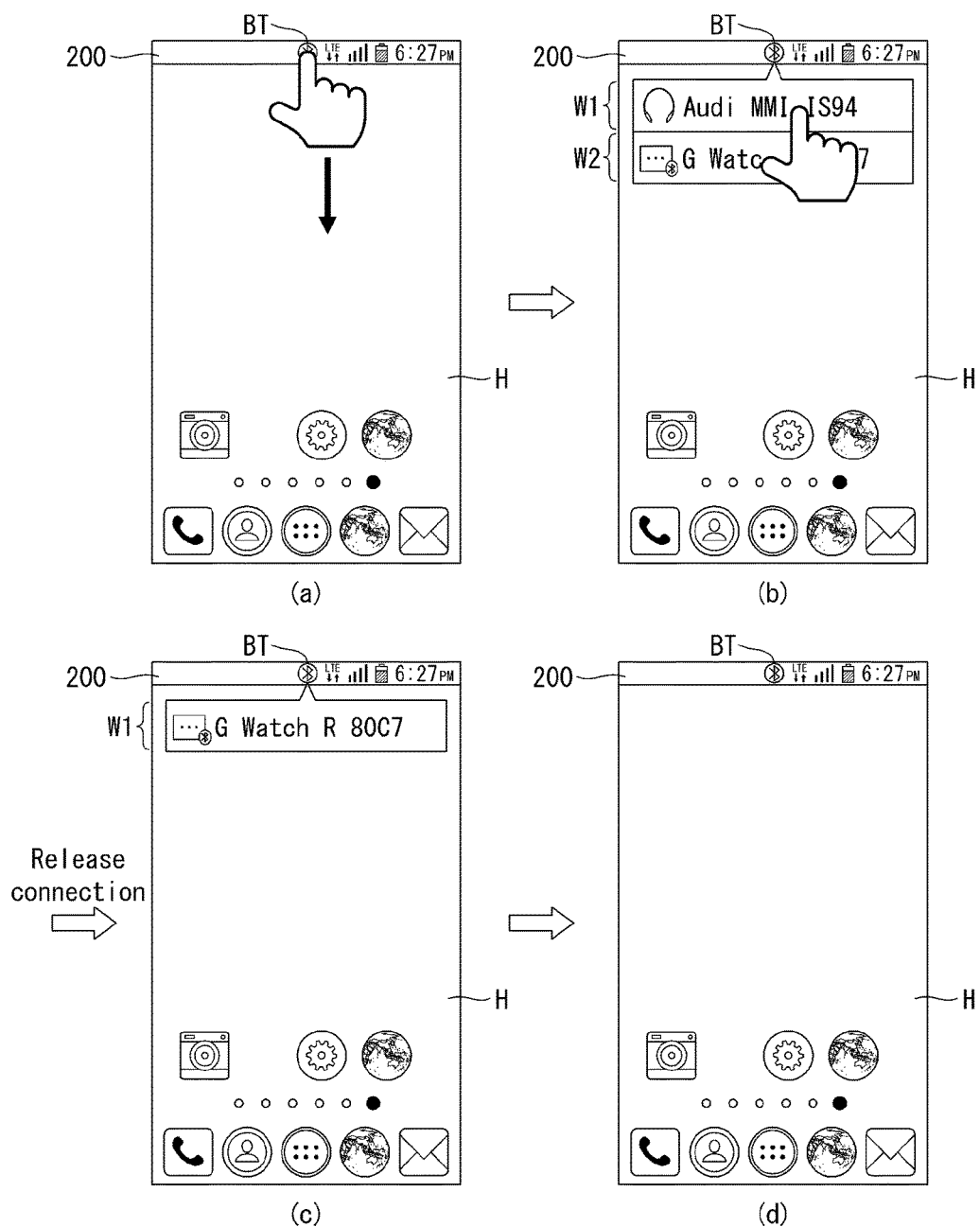

FIG. 42 illustrates a process of releasing a connection to a Bluetooth equipment when a connection release button x is not provided.

Referring to FIG. 42, as shown in FIG. 42A, when a Bluetooth function is in an activated state, the controller 180 displays a Bluetooth icon BT in the indicator area 200. Accordingly, when the user touches a Bluetooth icon BT displayed in the indicator area 200 or the indicator area 200, the controller 180 may display a window W1 that displays a Bluetooth connection equipment, as shown in FIG. 42B.

In the window W1, information of a device in a currently connecting state and information of a preset Bluetooth device or a frequent use Bluetooth device may be displayed. Information of the Bluetooth device displayed in the window W1 may include an icon of a corresponding device and a device name.

By performing a predetermined input to information of a connection device displayed in the window W1, the user may select a connection release function to a corresponding equipment. For example, when the user touches or clicks for a long time information of a connection device displayed in the window W1, a connection to a corresponding equipment may be released.

When a connection release input to a Bluetooth device is received, the controller 180 releases a connection to a corresponding device. Accordingly, as shown on a screen of FIG. 42C, information of a corresponding equipment is disappeared in the window W1.

Thereafter, when a separate input is not received, the controller 180 may display a home screen H, as shown on a screen of FIG. 42D.

Figure 43:
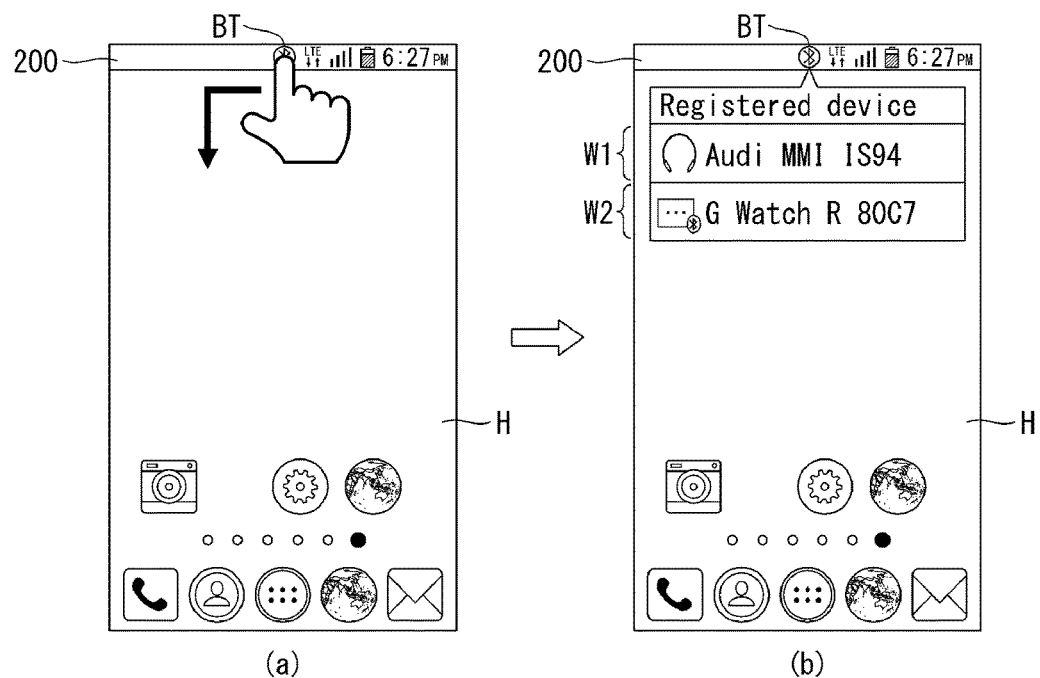
Figure 44:
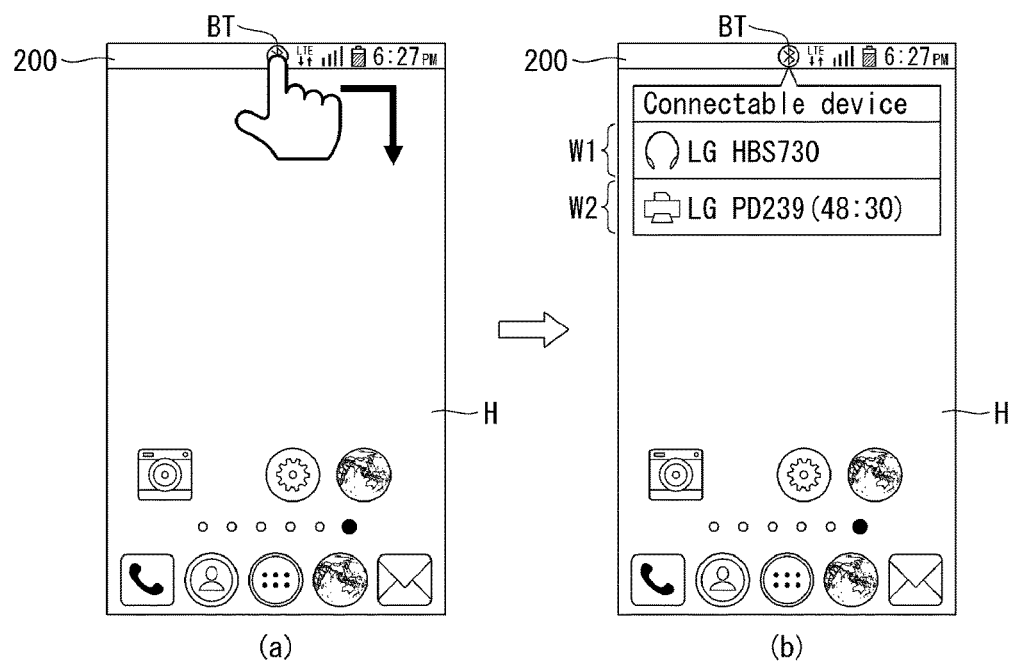

FIGS. 43 and 44 illustrate an exemplary embodiment that displays different information according to an input method to the Bluetooth icon BT displayed in the indicator area 200 and illustrate a case of dragging in a left direction or a right direction and dragging downward before dragging the Bluetooth icon BT downward.

Referring to FIG. 43, when the user drags the Bluetooth icon BT displayed in the indicator area 200 in a left direction and drags the Bluetooth icon BT downward, the window W1 that displays the Bluetooth device registered by the user may be displayed. When an input that drags in a left direction and that drags downward is received, the controller 180 displays the window W1 that displays the Bluetooth device registered by the user. When a touch input to the Bluetooth device displayed in the window W1 is received, the controller 180 may perform a connection to a corresponding equipment.

Referring to FIG. 44, when the user drags a Bluetooth icon BT displayed in the indicator area 200 in a right direction and drags the Bluetooth icon BT downward, a window W2 that displays a connectable Bluetooth device may be displayed. When an input that drags in a right direction and that drags downward is received, the controller 180 may scan an adjacent Bluetooth device to display a connectable Bluetooth device in the window W2. When a touch input to the Bluetooth device displayed in the window W2 is received, the controller 180 may perform a connection to a corresponding equipment.

A left/right direction and downward drag input described in the above-described description is an exemplary embodiment, and the user input may be classified into various directions, distances, and touch methods.

Figure 45:
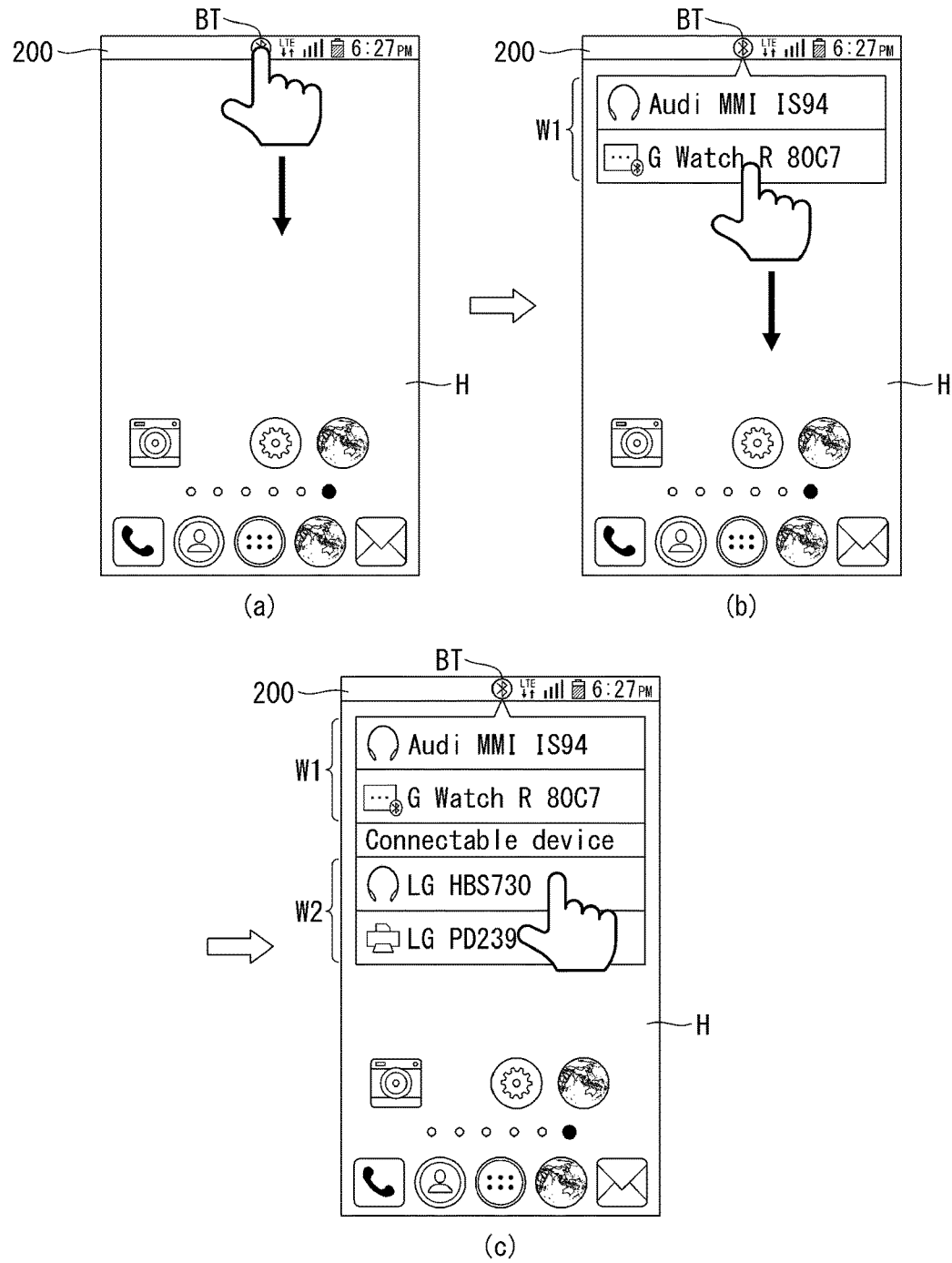

FIG. 45 illustrates an exemplary embodiment that displays different information according to a drag input distance started from the Bluetooth icon BT displayed in the indicator area 200.

Referring to FIG. 45A, when an input that drags the Bluetooth icon BT displayed in the indicator area 200 downward by a predetermined distance is received, the controller 180 may display a window W1 that displays a Bluetooth device registered by the user, as shown in FIG. 45B. When an input drag distance satisfies a first reference distance, the controller 180 displays the window W1 that displays a Bluetooth device registered by the user. When a touch input to the Bluetooth device displayed in the window W1 is received, the controller 180 may perform a connection to a corresponding equipment.

In a state in which the window W1 that displays the Bluetooth device registered by the user is displayed, when a user input that drags downward is received, the controller 180 may display a window W2 that displays a connectable Bluetooth device. When the input drag distance satisfies a second reference distance, the controller 180 may scan an adjacent Bluetooth device to display a connectable Bluetooth device in the window W2. When a touch input to the Bluetooth device displayed in the window W2 is received, the controller 180 may perform a connection to a corresponding equipment.

The present invention may be implemented with a computer readable code at a medium in which a program is recorded. A computer readable recording medium includes an entire kind of record device that stores data that may be read by a computer system. The computer readable medium may include, for example, a Hard Disk Drive (HDD), Solid State Disk (SSD), Silicon Disk Drive (SDD), read-only memory (ROM), random-access memory (RAM), compact disc read-only memory (CDROM), magnetic tape, floppy disk, and optical data storage and include implementation in a form of carrier waves (e.g., transmission through Internet). Further, the computer may include a controller 180 of the terminal. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

What is claimed is:

1. A mobile terminal, comprising:
a short range communication module;
a touch screen having an indicator area that displays information about a state of the mobile terminal; and
a controller configured to:
display a graphical object that indicates whether the short range communication module is activated in the indicator area,
display information about a connected device to which a connection to the short range communication module is set based on a user input in the indicator area having a displacement change in a first reference direction,
display information about one or more connectable devices that can connect to the short range communication module when a displacement magnitude of the user input is larger than a first reference distance, and
control a predetermined function using the short range communication module when a direction of the user input satisfies a second reference direction in the indicator area,
wherein the controller is further configured to:
display the information about the connected device to which the connection to the short range communication module is set with graphical objects associated with multiple devices, and
when a user multi-input to select the graphical objects simultaneously is received, execute functions of the multiple devices and display multiple execution screens according to the selected graphical objects associated with the multiple devices.

2. The mobile terminal of claim 1, wherein the controller is further configured to control the predetermined function using the short range communication module when a direction of the user input intersects a side of the indicator area.

3. The mobile terminal of claim 1, wherein the controller is further configured to display information about one or more devices connected to the short range communication module or set to be automatically connected to the short range communication module in a first window.

4. The mobile terminal of claim 1, wherein the controller is further configured to scan one of the connectable devices and to display information about the one of the connectable devices as a scan result in a second window when the displacement magnitude of the user input is equal to or larger than the first reference distance.

5. The mobile terminal of claim 1, wherein the controller is further configured to display the information about the connected device to which the connection to the short range communication module is set with a graphical object associated with the connected device and to selectively set or release a short range communication function with the connected device when a predetermined user input to the graphical object associated with the connected device is received.

6. The mobile terminal of claim 1, wherein the controller is further configured to display the information about the connected device to which the connection to the short range communication module is set with a graphical object associated with the connected device and to display state information of the connected device when a predetermined user input to the graphical object associated with the connected device is received.

7. The mobile terminal of claim 1, wherein the controller is further configured to:
display application information related to the connected device to which the connection to the short range communication module is set with a graphical object associated with a corresponding application, and to execute or stop the corresponding application when a predetermined user input is received.

8. The mobile terminal of claim 1, wherein the controller is further configured to display a third window that displays information about the state of the mobile terminal when the displacement magnitude of the user input is equal to or larger than a second reference distance that is larger than the first reference distance.

9. A mobile terminal, comprising:
a short range communication module;
a touch screen having an indicator area that displays information about a state of the mobile terminal; and
a controller configured to:
display a graphical object that indicates whether the short range communication module is activated in the indicator area,
display information about a connected device to which a connection to the short range communication module is set in the indicator area based on a displacement change of a user input to the graphical object when the user input is input in a length direction of the indicator area;
display information about connectable devices that can connect to the short range communication module in the indicator area when a displacement magnitude of the user input is larger than a first reference distance; and
control a predetermined function using the short range communication module when a direction of the user input satisfies a reference direction,
wherein the controller is further configured to:
display the information about the connected device to which the connection to the short range communication module is set with graphical objects associated with multiple devices, and
when a user multi-input to select the graphical objects simultaneously is received, execute functions of the multiple devices and display multiple execution screens according to the selected graphical objects associated with the multiple devices.

10. The mobile terminal of claim 9, wherein the controller is further configured to display the information about the connected device to which the connection to the short range communication module is set with a graphical object associated with the connected device and to selectively set or release a short range communication function with the connected device when a predetermined user input to the graphical object associated with the connected device is received.

11. The mobile terminal of claim 9, wherein the controller is further configured to display a window presenting application information related to the connected device to which the connection to the short range communication module is set when the information about the connected device that is displayed in the indicator area is selected.

12. The mobile terminal of claim 11, wherein the controller is further configured to display the application information with graphical object associated with a corresponding application and to selectively execute or stop the corresponding application when a predetermined user input to the graphical object associated with the corresponding application is received.

13. A mobile terminal, comprising:
a short range communication module;
a touch screen having an indicator area that displays information about a state of the mobile terminal; and
a controller configured to:
display a first graphical object that indicates whether the short range communication module is activated in the indicator area,
display a second graphical object for controlling a short range communication function in an area of the touch screen outside of the indicator area when a user input to the first graphical object is received,
display information about a connected device to which a connection to the short range communication module is set based on a displacement change of a user input to the second graphical object for controlling the short range communication function;
display information about connectable devices that can connect to the short range communications module when a displacement magnitude of the user input is larger than a first reference distance; and
control a predetermined function using the short range communication module when the direction of the user input satisfies a particular direction in the indicator area,
wherein the controller is further configured to:
display the information about the connected device to which the connection to the short range communication module is set with graphical objects associated with multiple devices, and
when a user multi-input to select the graphical objects simultaneously is received, execute functions of the multiple devices and display multiple execution screens according to the selected graphical objects associated with the multiple devices.

14. The mobile terminal of claim 13, wherein the controller is further configured to display the information about the connected device to which the connection to the short range communication module is set with a third graphical object associated with the connected device and to set or release a short communication function with the connected device when a predetermined user input to the third graphical object is received.

15. The mobile terminal of claim 14, wherein the controller is further configured to display a window presenting application information related to the connected device to which the connection to the short range communication module is set when the information about the connected device is selected.

16. The mobile terminal of claim 15, wherein the controller is further configured to display the application information with fourth graphical object associated with a corresponding application and to execute or stop the corresponding application when a predetermined user input to the fourth graphical object is received.

17. A method of controlling a mobile terminal having a touch screen including an indicator area that displays information about a state of a short range communication module and the mobile terminal, the method comprising:
displaying a graphical object that indicates whether the short range communication module is activated in the indicator area;
displaying information about a connected device to which a connection to the short range communication module is set based on a user input in the indicator area having a displacement change in a first direction;
scanning, when a displacement magnitude of the user input is larger than a first reference distance, for connectable devices and displaying information about the connectable devices; and
controlling a predetermined function using the short range communication module, when a direction of the user input in the indicator area satisfies a second direction,
wherein the method further comprises:
displaying graphical objects associated with multiple devices with the information about the connected device to which the connection to the short range communication module is set, and
when a user multi-input to select the graphical objects simultaneously is received, executing functions of the multiple devices and displaying multiple execution screens according to the selected graphical objects associated with the multiple devices.

18. The method of claim 17, wherein displaying the information about the connected device to which the connection to the short range communication module is set includes displaying information about devices connected to the short range communication module or set to be automatically connected to the short range communication module and application information related to the devices in a first window.

19. The method of claim 17, wherein scanning for the connectable devices includes:
scanning a device that can be connected to the short range communication module if the displacement magnitude of the user input is equal to or larger than the first reference distance; and
displaying information the connectable devices as a scan result and application information related to the device that can be connected to the short range communication module in a second window.

20. The method of claim 17, further comprising:
displaying a third window that displays information regarding the state of the mobile terminal when the displacement magnitude of the user input is equal to or larger than a second distance that is larger than the first reference distance.

\* \* \* \* \*